United States Patent
Kawata

(10) Patent No.: US 12,298,121 B2
(45) Date of Patent: May 13, 2025

(54) CALIBRATION METHOD FOR OPTICAL ROTATION PROBE

(71) Applicant: Tokyo Seimitsu Co., Ltd., Tokyo (JP)

(72) Inventor: Yoshiyuki Kawata, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 18/472,361

(22) Filed: Sep. 22, 2023

(65) Prior Publication Data
US 2024/0011767 A1    Jan. 11, 2024

Related U.S. Application Data

(63) Continuation of application No. PCT/JP2022/011900, filed on Mar. 16, 2022.

(30) Foreign Application Priority Data

Mar. 25, 2021   (JP) ................................ 2021-052206

(51) Int. Cl.
   *G01B 11/24* (2006.01)
   *G01B 21/04* (2006.01)

(52) U.S. Cl.
   CPC ............ *G01B 11/24* (2013.01); *G01B 21/042* (2013.01)

(58) Field of Classification Search
   CPC ......... G01J 2001/4247; G01B 11/2504; G01B 11/2518; G01B 11/04; G01B 11/24; G01B 11/28
   See application file for complete search history.

(56) References Cited

U.S. PATENT DOCUMENTS

| | | | |
|---|---|---|---|
| 11,326,865 B2 * | 5/2022 | Tobiason | ............... G01B 11/24 |
| 2015/0211850 A1 | 7/2015 | Harsila | |

(Continued)

FOREIGN PATENT DOCUMENTS

| | | |
|---|---|---|
| JP | 2016-24086 A | 2/2016 |
| JP | 2017-187335 A | 10/2017 |

(Continued)

OTHER PUBLICATIONS

International Search Report (PCT/ISA/210), issued in PCT/JP2022/011900, dated Jun. 7, 2022.

(Continued)

*Primary Examiner* — Rebecca C Bryant
(74) *Attorney, Agent, or Firm* — Birch, Stewart, Kolasch & Birch, LLP

(57) ABSTRACT

The calibration method includes changing the emission direction of the measurement light to be emitted from the optical rotation probe by a minute angle from a reference direction set in advance, acquiring a shape error for a reference object after changing the emission direction by emitting the measurement light from the optical rotation probe toward the reference object while rotating the emission direction of the measurement light around an S axis and varying a relative position between the optical rotation probe and the reference object, and calculating an adjustment error of the emission direction of the measurement light with respect to the reference direction based on a theoretical value of the shape error for the reference object to be obtained in a case where the emission direction of the measurement light matches the reference direction and a measurement value of the acquired shape error for the reference object.

6 Claims, 20 Drawing Sheets

(56) References Cited

U.S. PATENT DOCUMENTS

2018/0143000 A1  5/2018  Yamazaki et al.
2019/0113333 A1  4/2019  Takahama

FOREIGN PATENT DOCUMENTS

| JP | 2018-84434 A | 5/2018 |
| JP | 2019-74470 A | 5/2019 |
| JP | 2019-191050 A | 10/2019 |
| JP | 2020-98180 A | 6/2020 |
| WO | WO 2011/120528 A1 | 10/2011 |
| WO | WO 2017/006848 A1 | 1/2017 |

OTHER PUBLICATIONS

Written Opinion of the International Searching Authority (PCT/ISA/237), issued in PCT/JP2022/011900, dated Jun. 7, 2022.
Extended European Search Report for corresponding European Application No. 22775322.5, dated Jan. 23, 2024.

\* cited by examiner

CALIBRATION METHOD FOR OPTICAL ROTATION PROBE

CROSS-REFERENCE TO RELATED APPLICATIONS

The present application is a Continuation of PCT International Application No. PCT/JP2022/011900 filed on Mar. 16, 2022 claiming priority under 35 U.S.C § 119(a) to Japanese Patent Application No. 2021-052206 filed on Mar. 25, 2021. Each of the above applications is hereby expressly incorporated by reference, in their entirety, into the present application.

BACKGROUND OF THE INVENTION

Field of the Invention

The presently disclosed subject matter relates to a technique for calibrating an emission direction of measurement light emitted from an optical rotation probe.

Description of the Related Art

As a shape measurement apparatus that measures a shape of an object to be measured, for example, a three-dimensional coordinate measurement apparatus that obtains a shape of an object to be measured by detecting three-dimensional coordinate values of various measurement points of the object to be measured using an optical probe in a non-contact manner is known. The optical probe radiates measurement light from a light source toward the measurement points of the object to be measured and receives reflected light of the measurement light reflected at the measurement points. Then, the shape measurement apparatus measures a shape of the object to be measured based on a result of detection of distances from the optical probe to the measurement points by a known measurement method using an interferometer.

As such an optical probe, an optical rotation probe capable of performing rotational scanning around the longitudinal axis of the probe as disclosed in PTL 1 is known. In a three-dimensional coordinate measurement apparatus equipped with the optical rotation probe can, for example, measure an inner shape of a cylindrical object to be measured and concurrently measure a surface shape by performing rotational scanning using the optical rotation probe.

CITATION LIST

PTL 1: Japanese Patent Application Laid-Open No. 2020-098180

SUMMARY OF THE INVENTION

In recent years, there is a need for measurement of a shape of a local portion with a great curvature in shape measurement of an object to be measured. However, it is difficult with the three-dimensional measurement apparatus disclosed in PTL 1 to accurately set an emission direction of measurement light of the optical rotation probe with respect to a reference direction in calibration, and there is a problem that a measurement error becomes large in a case where such a shape of a local portion with a great curvature is measured.

The presently disclosed subject matter has been made in view of such circumstances and is directed to providing a calibration method for an optical rotation probe capable of calibrating an emission direction of measurement light emitted from an optical rotation probe with high accuracy.

To solve the above-described problem, a calibration method for an optical rotation probe capable of emitting measurement light in a direction perpendicular to a probe axis and capable of rotating an emission direction of the measurement light around the probe axis according to one aspect of the presently disclosed subject matter includes a change step of changing the emission direction of the measurement light by a minute angle from a reference direction set in advance, an acquisition step of acquiring a shape error for a reference object after the change step by emitting the measurement light from the optical rotation probe toward the reference object while rotating the emission direction of the measurement light around the probe axis and varying a relative position between the optical rotation probe and the reference object, and an adjustment error calculation step of calculating an adjustment error of the emission direction of the measurement light with respect to the reference direction based on a theoretical value of the shape error for the reference object to be obtained in a case where the emission direction of the measurement light matches the reference direction and a measurement value of the shape error for the reference object obtained in the acquisition step.

According to the calibration method for the optical rotation probe according to the above-described aspect, the adjustment error of the emission direction of the measurement light with respect to the reference direction can be calculated, so that even in the case where an adjustment error remains after calibration of the emission direction, the emission direction can be recalibrated based on the calculated adjustment error. This can improve calibration accuracy of the emission direction of the optical rotation probe and eventually reduce a measurement error in a three-dimensional coordinate measurement apparatus equipped with the optical rotation probe.

Preferably, each of the change step and the acquisition step is performed a plurality of times while altering the minute angle, and in the adjustment error calculation step, the adjustment error of the emission direction of the measurement light with respect to the reference direction is calculated based on the shape error for the reference object acquired for each of the minute angle.

Preferably, in the acquisition step, the relative position between the optical rotation probe and the reference object is varied such that a distance between the optical rotation probe and the reference object is constant.

Preferably, in the acquisition step, the relative position between the optical rotation probe and the reference object is varied such that a surface to be measured of the reference object is located in a range of a focal position of the measurement light±a focal depth.

Preferably, the reference object is a pin gauge disposed in parallel to the probe axis.

Preferably, in the acquisition step, a radius error for the pin gauge is acquired as the shape error for the reference object.

According to the presently disclosed subject matter, an adjustment error with respect to a reference direction can be calculated for an emission direction of measurement light emitted from an optical rotation probe, so that it is possible to perform calibration of the optical rotation probe with high accuracy.

DESCRIPTION OF THE EMBODIMENTS

Embodiments according to the presently disclosed subject matter will be described below in accordance with the accompanying drawings. Prior to description of a calibration method for an optical rotation probe, a configuration of a three-dimensional coordinate measurement apparatus will be described.

[Configuration of Three-Dimensional Coordinate Measurement Apparatus]

Figure 1:
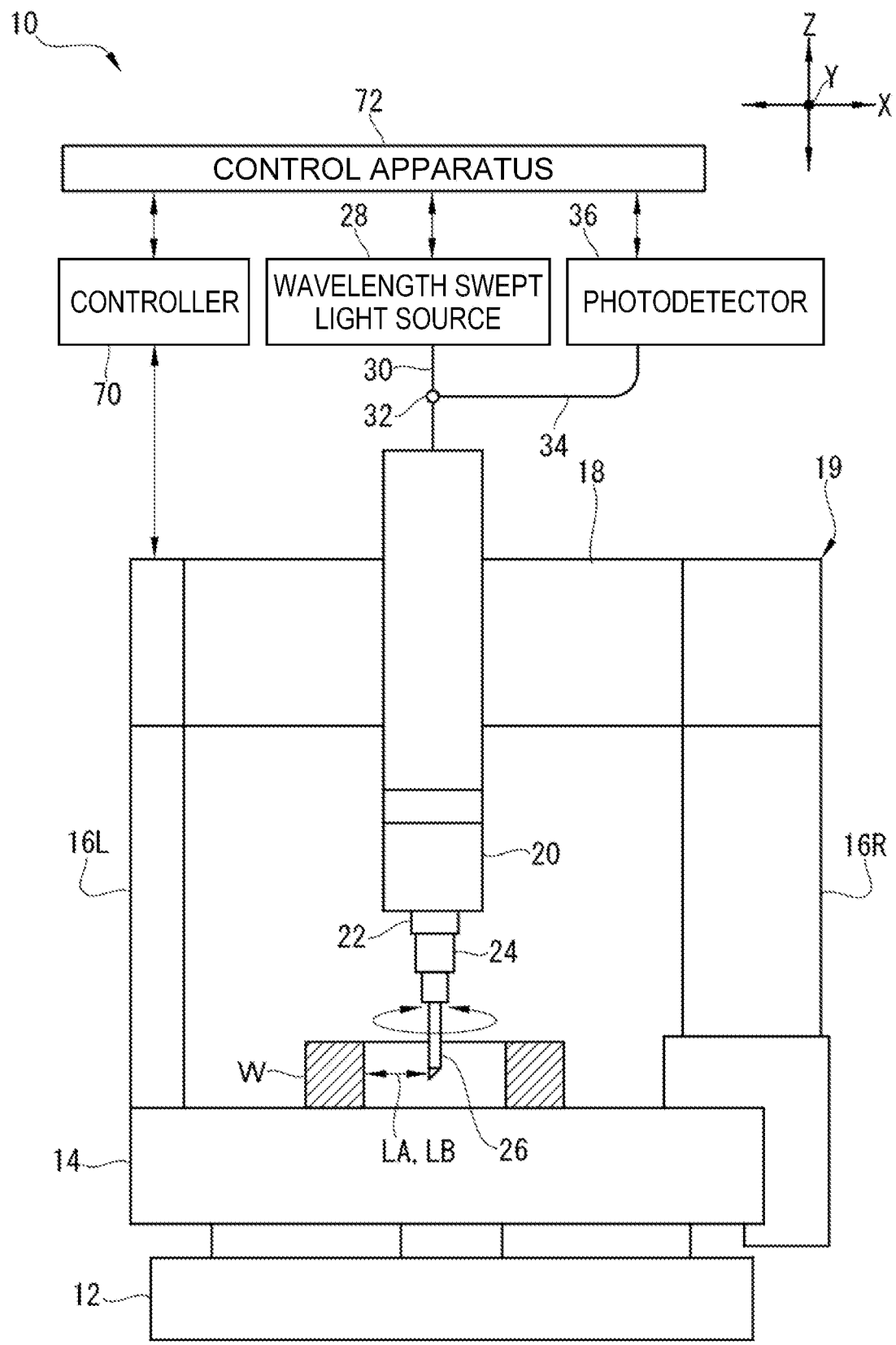
FIG. 1 is a schematic view of a three-dimensional coordinate measurement apparatus.

FIG. 1 is a schematic view of a three-dimensional coordinate measurement apparatus 10. An X axis, a Y axis and a Z axis in FIG. 1 are a machine coordinate system defined based on a machine coordinate origin specific to the three-dimensional coordinate measurement apparatus 10.

As illustrated in FIG. 1, the three-dimensional coordinate measurement apparatus 10 performs shape measurement of a workpiece W, for example, shape measurement of an inner periphery of the cylindrical workpiece W using an optical rotation probe 26. A shape of the workpiece W described here may include a three-dimensional shape, a two-dimensional shape, a surface shape, a profile shape, various kinds of dimensional shapes such as a length and a diameter, and the like of the workpiece W. Further, a shape and a type of the workpiece W to be measured is not particularly limited.

The three-dimensional coordinate measurement apparatus 10 includes a mount 12, a table 14 (surface plate) provided on the mount 12, a right Y carriage 16R and a left Y carriage 16L provided to stand on both end portions of the table 14, and an X guide 18 that connects an upper portion of the right Y carriage 16R and an upper portion of the left Y carriage 16L. The right Y carriage 16R, the left Y carriage 16L and the X guide 18 constitute a portal frame 19.

Sliding surfaces on which the right Y carriage 16R and the left Y carriage 16L slide along the Y axis direction are formed on upper surfaces and lateral surfaces of the both end portions of the X axis direction of the table 14. Air bearings (not illustrated) may be provided at positions facing the sliding surfaces of the table 14, in the right Y carriage 16R and the left Y carriage 16L. This allows the right Y carriage 16R and the left Y carriage 16L to move in the Y axis direction along with the X guide 18.

An X carriage 20 is attached to the X guide 18. A sliding surface on which the X carriage 20 slides is formed along the X axis direction on the X guide 18. Further, an air bearing (not illustrated) is provided at a position facing the sliding surface of the X guide 18, in the X carriage 20. This allows the X carriage 20 to move in the X axis direction.

A Z carriage 22 (also referred to as a Z spindle) is attached to the X carriage 20. Further, an air bearing (not illustrated) for guide in the Z axis direction for guiding the Z carriage 22 in the Z axis direction is provided at the X carriage 20. By this means, the Z carriage 22 is held so as to be movable in the Z axis direction by the X carriage 20. A measurement head 24 that selectively and detachably holds various kinds of known probes including the optical rotation probe 26 is provided at a lower end of the Z carriage 22.

While not illustrated, a Y axis driving unit that moves the portal frame 19 in the Y axis direction, an X axis driving unit that moves the X carriage 20 in the X axis direction, and a Z axis driving unit that moves the Z carriage 22 in the Z axis direction may be provided in the three-dimensional coordinate measurement apparatus 10. This enables the measurement head 24 (optical rotation probe 26) to move in three-axis directions (XYZ axis directions) that are orthogonal to one another.

A Y axis linear scale (not illustrated) is provided at an end portion on the right Y carriage 16R side of the table 14. Further, an X axis linear scale (not illustrated) is provided at the X guide 18, and a Z axis linear scale (not illustrated) is provided at the Z carriage 22.

On the other hand, a Y axis detecting unit (not illustrated) that reads the Y axis linear scale is provided at the right Y carriage 16R. Further, an X axis detecting unit (not illustrated) and a Z axis detecting unit (not illustrated) that respectively read the X axis linear scale and the Z axis linear scale are provided at the X carriage 20. Detection results of the respective detecting units are output to a control apparatus 72 via a controller 70.

A head driving unit (not illustrated) such as a motor that rotates the optical rotation probe 26 in each of a direction around a rotation axis parallel to the Z axis direction and a direction around a rotation axis perpendicular to the Z axis is provided at the measurement head 24. By this means, the measurement head 24 can steplessly adjust a rotation angle of the optical rotation probe 26 in directions around two rotation axes. This results in enabling a posture of the optical rotation probe 26 to be arbitrarily displaced (rotated).

A probe rotation angle detecting unit (not illustrated) such as a rotary encoder that detects each rotation angle of the optical rotation probe 26 may be provided at the measurement head 24. A detection result by the probe rotation angle detecting unit is output to the control apparatus 72 via the controller 70.

The optical rotation probe 26 is detachably attached to the measurement head 24. The optical rotation probe 26 emits measurement light LA input from a wavelength swept light source 28 via an optical fiber cable 30 and a fiber circulator 32, toward a measurement surface (here, an inner periphery) of the workpiece W. Further, the optical rotation probe 26 receives reflected light LB reflected on the measurement surface of the workpiece W and outputs the reflected light LB and reference light LC (see FIG. 3) which will be described later to a photodetector 36 via the fiber circulator 32 and an optical fiber cable 34.

Further, while described in detail later, the optical rotation probe 26 is configured such that a tip portion (rotating optical system 42, see FIG. 2) of the optical rotation probe 26 is rotatable in a direction around a longitudinal axis 62a (corresponding to a probe axis in the presently disclosed subject matter, see FIG. 2) which will be described later. This enables the optical rotation probe 26 to perform rotational scanning with the measurement light LA along the measurement surface of the workpiece W by rotating its tip portion.

Figure 2:
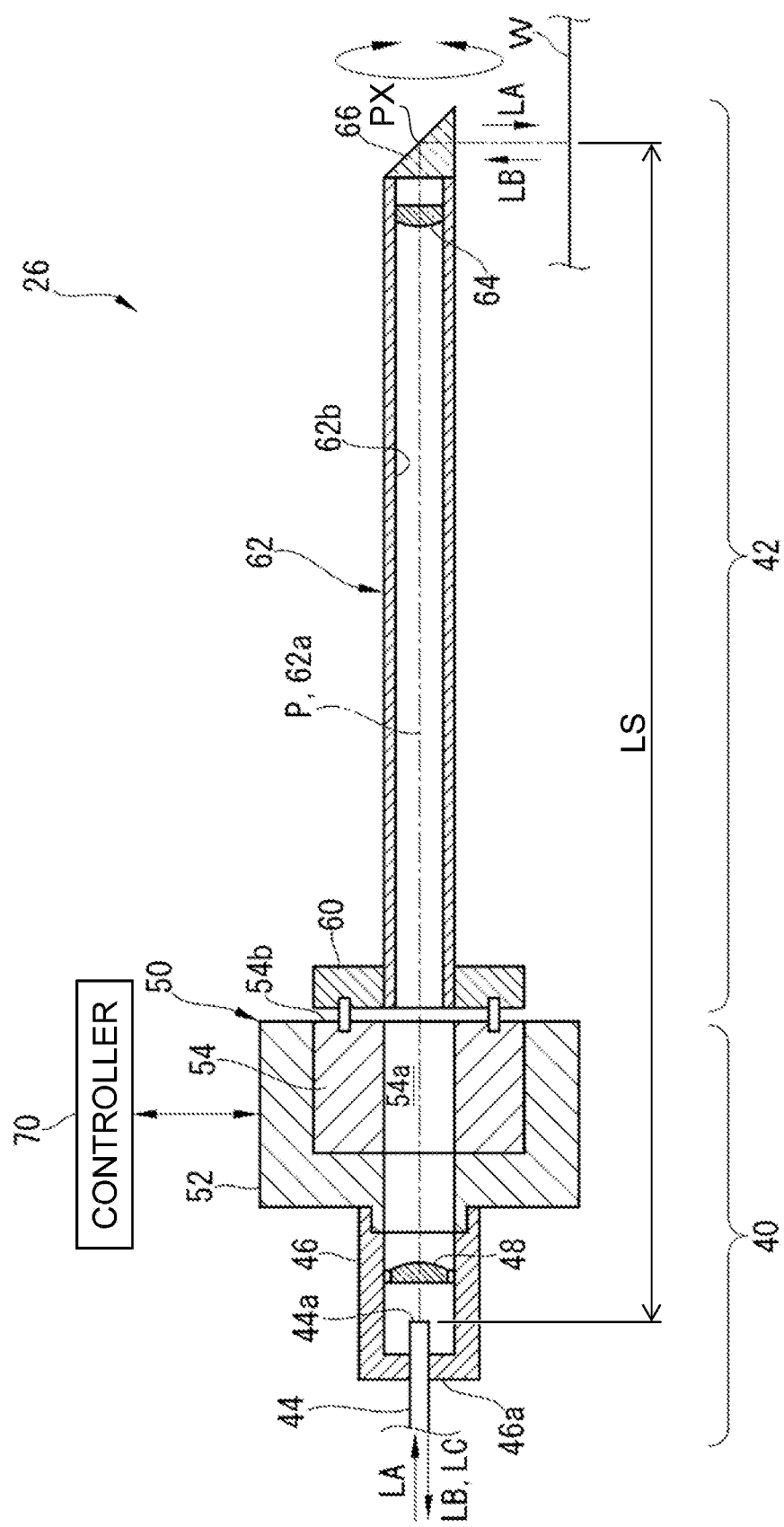
FIG. 2 is an example of a cross-sectional diagram of an optical rotation probe.

FIG. 2 is a cross-sectional diagram of the optical rotation probe 26. As illustrated in FIG. 2, the optical rotation probe 26 includes a fixed optical system 40 fixed at the measurement head 24, and the rotating optical system 42 rotating in a direction around the longitudinal axis 62a of the optical rotation probe 26 by the fixed optical system 40.

The fixed optical system 40 includes an optical fiber cable 44, a head attaching portion 46, a collimator lens 48, and a hollow motor 50.

As the optical fiber cable 44 (the same applies to other optical fiber cables 30 and 34), known various kinds of optical fiber cables such as a single mode optical fiber cable and a polarization maintaining optical fiber cable are used.

One end side of the optical fiber cable 44 is inserted inside the measurement head 24 and inside of the Z carriage 22 and is connected to the fiber circulator 32. Further, the other end side of the optical fiber cable 44 is connected to the head attaching portion 46. An end surface on the other end side of the optical fiber cable 44 serves as an emission/incident end 44a from which the measurement light LA input from the wavelength swept light source 28 via the optical fiber cable 30, and the like, is emitted and to which the reflected light LB, and the like, reflected on the measurement surface of the workpiece W are incident. A reference character P in the drawing designates an optical path of the measurement light LA and the reflected light LB.

Figure 3:
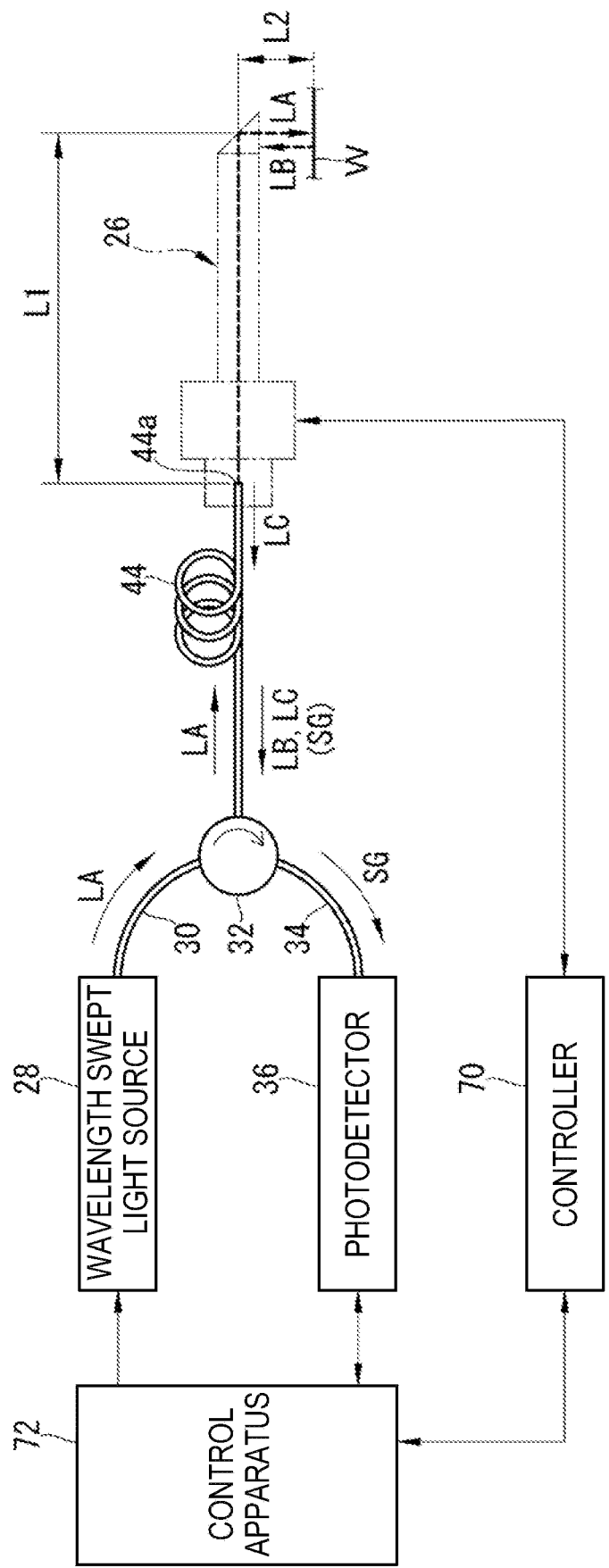
FIG. 3 is an explanatory diagram for explaining shape measurement of a measurement surface of a workpiece using the optical rotation probe.

Further, part of the measurement light LA input from the wavelength swept light source 28, or the like, to the optical fiber cable 44 is reflected at the emission/incident end 44a as reference light LC (see FIG. 3).

The head attaching portion 46 is a hollow cylindrical body extending in a direction parallel to the optical path P (longitudinal axis 62a). One end side of the head attaching portion 46 is detachably attached to the measurement head 24 described above. Further, the hollow motor 50 is fixed on the other end side of the head attaching portion 46. Still further, a cable connecting portion 46a to which the other end side of the optical fiber cable 44 is connected is provided on the one end side of the head attaching portion 46. The cable connecting portion 46a holds the emission/incident end 44a of the optical fiber cable 44 inside the head attaching portion 46 and at a position at which the emission/incident end 44a matches (including substantially matches, the same will apply below) a central axis of the head attaching portion 46.

The collimator lens 48 is provided inside the head attaching portion 46 and at a position between the emission/incident end 44a and the hollow motor 50. An optical axis of the collimator lens 48 matches a central line of the optical path P. The collimator lens 48 converts the measurement light LA emitted from the emission/incident end 44a into parallel light and then emits the measurement light LA toward an imaging lens 64 inside a shaft 62 which will be described later. This can prevent degradation of photosensitivity of the reflected light LB due to misalignment between the fixed optical system 40 and the rotating optical system 42. Further, the collimator lens 48 emits the reflected light LB incident from the imaging lens 64 toward the emission/incident end 44a.

The hollow motor 50 rotates the shaft 62 which will be described later in a direction around the longitudinal axis 62a (hereinafter, simply referred to as a direction around the longitudinal axis). The hollow motor 50 includes a hollow stator 52 (also referred to as a stator) constituted by a coil (not illustrated) being wound, and a hollow rotor 54 (also referred to as a rotor) rotating in a direction around the longitudinal axis inside the stator 52. A detailed structure of the hollow motor 50 is a known technique, and thus, detailed description will be omitted.

A hollow portion 54a through which the optical path P passes and extending in a direction parallel to the optical path P (the longitudinal axis 62a) is formed in the rotor 54. By this means, the measurement light LA emitted from the collimator lens 48 passes through inside the hollow portion 54a and is incident on the imaging lens 64 which will be described later, and the reflected light LB emitted from the imaging lens 64 passes through inside the hollow portion 54a and is incident on the collimator lens 48.

The rotor 54 rotates around the longitudinal axis 62a in accordance with application of a drive signal (voltage) to the stator 52 from the controller 70. A rotor rotation angle detecting unit (not illustrated) such as a rotary encoder that detects each rotation angle of the rotor 54 may be provided in the hollow motor 50. A detection result by the rotor rotation angle detecting unit is output to the control apparatus 72 via the controller 70. The rotation angle of the rotor 54 may be made detectable by, for example, controlling the rotation angle, and the like, of the rotor 54 by known servo control instead of using the rotor rotation angle detecting unit.

Further, a shaft holding plate 60 which will be described later, included in the rotating optical system 42 is fixed at a circular tip surface 54b on a side facing the rotating optical system 42, of the rotor 54.

The hollow motor 50 may not be limited to the configuration (structure) illustrated in FIG. 2, and known various kinds of hollow motors may be used instead.

The rotating optical system 42 rotates in a direction around the longitudinal axis in accordance with rotation of the rotor 54. The rotating optical system 42 includes the shaft holding plate 60, the shaft 62, the imaging lens 64, and a right angle prism mirror 66.

The shaft holding plate 60 is formed in a shape (circular shape) substantially the same as a shape of the tip surface 54b of the rotor 54 and fixed on the tip surface 54b in a posture parallel to the tip surface 54b. A fitting hole through which the optical path P passes and which extends in a direction parallel to the optical path P (longitudinal axis 62a) is formed at the shaft holding plate 60. One end portion of the shaft 62 is fitted into the fitting hole. By this means, the shaft holding plate 60 holds the shaft 62 in a state where the longitudinal axis 62a matches the central line of the optical path P.

The shaft 62, which is a hollow cylinder extending in a direction parallel to the optical path P, has the longitudinal axis 62a parallel to the optical path P. Further, in a state where one end portion of the shaft 62 is fixed at the shaft holding plate 60, the longitudinal axis 62a matches (substantially matches) the central line of the optical path P, and an inner surface 62b of the shaft 62 encloses the optical path P.

Further, the imaging lens 64 is provided inside the shaft 62 and on the other end portion that is an opposite side of the one end portion described above of the shaft 62. Further, the right angle prism mirror 66 is provided at the other end portion of the shaft 62 so as to cover an opening portion on the other end side of the shaft 62.

The imaging lens 64 is disposed at a position at which the optical axis of the imaging lens 64 matches the central line of the optical path P. The imaging lens 64 causes an image of the measurement light LA incident from the collimator lens 48 to be formed on the measurement surface of the workpiece W through the right angle prism mirror 66. Further, the imaging lens 64 emits the reflected light LB incident through the right angle prism mirror 66 toward the collimator lens 48.

The right angle prism mirror 66 reflects the measurement light LA incident through inside of the shaft 62 and the imaging lens 64 toward the measurement surface of the workpiece W. Specifically, the right angle prism mirror 66 refracts the measurement light LA incident from the imaging lens 64 at 90° (including substantially 90°) to obtain a light flux parallel to a rotation plane (plane perpendicular to the longitudinal axis 62a (rotation axis)) of the right angle prism mirror 66, or the like, and then, emits the light flux toward the measurement surface of the workpiece W.

Further, the right angle prism mirror 66 reflects the reflected light LB reflected on the measurement surface of the workpiece W toward the imaging lens 64. By this means, the reflected light LB is incident on the emission/incident end 44a of the optical fiber cable 44 from the right angle prism mirror 66 through the collimator lens 48.

The shaft holding plate 60, the shaft 62, the imaging lens 64 and the right angle prism mirror 66 included in the rotating optical system 42 integrally rotate in a direction around the longitudinal axis in accordance with rotation of the rotor 54. Then, as a result of the right angle prism mirror 66 rotating in the direction around the longitudinal axis, rotational scanning is performed with the measurement light LA along the measurement surface of the workpiece W.

Returning to FIG. 1, in a case where the three-dimensional coordinate measurement apparatus 10 is in a manual measurement mode, the controller 70 drives the respective driving units (the XYZ driving units and the head driving unit) (not illustrated) in response to operation input to an operating unit (not illustrated) to displace a position and a posture of the optical rotation probe 26 and drives the hollow motor 50 to rotate the right angle prism mirror 66, and the like, in the direction around the longitudinal axis. Further, in a case where the three-dimensional coordinate measurement apparatus 10 is in an automatic measurement mode, the controller 70 drives the respective driving units and the hollow motor 50 under control by the control apparatus 72 to displace the position and the posture of the optical rotation probe 26 and rotate the right angle prism mirror 66, and the like, in the direction around the longitudinal axis.

Further, the respective detecting units (not illustrated) (the XYZ axis detecting units, the probe rotation angle detecting unit and the rotor rotation angle detecting unit) described above are connected to the controller 70, and signals, and the like, output from the respective detecting units are output to the control apparatus 72.

FIG. 3 is an explanatory diagram for explaining shape measurement of the measurement surface of the workpiece W using the optical rotation probe 26. As illustrated in FIG. 3, and FIG. 1 and FIG. 2 described above, the wavelength swept light source 28 emits the measurement light LA to the fiber circulator 32 via the optical fiber cable 30. The measurement light LA is wavelength swept light having a wavelength varying in a fixed wavelength band in a sine wave in a fixed wavelength sweep cycle (with a fixed wavelength sweep frequency).

The fiber circulator 32 is connected to the wavelength swept light source 28 via the optical fiber cable 30, is connected to the photodetector 36 via the optical fiber cable 34 and is connected to the optical fiber cable 44 of the optical rotation probe 26.

The fiber circulator 32, which is, for example, a non-reciprocating type and one-direction type device having three ports, outputs the measurement light LA input from the wavelength swept light source 28 via the optical fiber cable 30 to the optical fiber cable 44. By this means, the measurement light LA is input to the optical rotation probe 26 from the wavelength swept light source 28. As a result, the reflected light LB reflected on the measurement surface of the workpiece W and the reference light LC reflected at the emission/incident end 44a are input to the fiber circulator 32 via the optical fiber cable 44.

Further, the fiber circulator 32 outputs an interference signal SG of the reflected light LB and the reference light LC input from the optical rotation probe 26 to the photodetector 36 via the optical fiber cable 34.

As the photodetector 36, for example, a silicon photo diode, an indium gallium arsenic (InGaAs) photodiode, a photoelectric tube, a photo multiplier tube, or the like, is used. The photodetector 36 converts the interference signal SG input from the fiber circulator 32 via the optical fiber cable 34 to obtain an electrical signal and amplifies and outputs the electrical signal to the control apparatus 72 under control by the control apparatus 72.

The control apparatus 72 includes, for example, an arithmetic apparatus such as a personal computer and includes an arithmetic circuit constituted with various kinds of processors and a memory, and the like. Various kinds of processors include a central processing unit (CPU), a graphics processing unit (GPU), an application specific integrated circuit (ASIC), a programmable logic device (for example, simple programmable logic devices (SPLD), a complex programmable logic device (CPLD) and a field programmable gate arrays (FPGA)), and the like. Here, various kinds of functions of the control apparatus 72 may be implemented by one processor or may be implemented by processors of the same type or different types.

For example, during the automatic measurement mode, the control apparatus 72 drives the respective driving units (not illustrated) described above and the hollow motor 50 in accordance with a measurement program determined in advance to execute displacement of the position and the posture of the optical rotation probe 26 and rotation of the right angle prism mirror 66, and the like, in the direction around the longitudinal axis. By this means, the optical rotation probe 26 executes rotational scanning of the measurement surface of the workpiece W with the measurement light LA, and the photodetector 36 detects the interference signal SG for each of measurement points on the measurement surface. As a result, a detection result of the interference signal SG for each of the measurement points is input to the control apparatus 72 from the photodetector 36. The control apparatus 72 may cause rotational scanning with the measurement light LA described above to be executed in response to operation input with respect to the operating unit (not illustrated) during the manual measurement mode.

Further, the control apparatus 72 calculates a distance L2 from the right angle prism mirror 66 to the measurement point on the measurement surface of the workpiece W for each of the measurement points based on the detection result of the interference signal SG for each of the measurement points detected by the photodetector 36 in both the automatic measurement mode and the manual measurement mode.

Specifically, the control apparatus 72 calculates for each of the measurement points, a total value of distances (L1+L2) of a distance L1 from the emission/incident end 44a to the right angle prism mirror 66 and the distance L2 for each of the measurement points described above based on the detection result of the interference signal SG for each of the measurement points. Here, a calculation method of the total value of the distances is a known technique (for example, Japanese Patent Application Laid-Open No. 2016-024086 and Japanese Patent Application Laid-Open No. 2018-084434), and thus, specific description will be omitted here.

Then, the control apparatus 72 calculates the distance L2 for each of the measurement points based on the calculation result of the total value of the distances for each of the measurement points and the known distance L1. Then, the control apparatus 72 calculates a three-dimensional coordinate for each of the measurement points based on the position and the posture of the optical rotation probe 26 for each of the measurement points, the rotation angle in the direction around the longitudinal axis of the right angle prism mirror 66, and the like, for each of the measurement points, and the calculation result of the distance L2 for each of the measurement points. As a result of this, the control apparatus 72 can calculate a shape of the measurement surface of the workpiece W scanned with the measurement light LA.

Here, the optical rotation probe illustrated in FIG. 2 and FIG. 3 is merely an example, and of course, does not intend to limit the configuration of the optical rotation probe.

[Calibration Method for Optical Rotation Probe According to First Embodiment]

Figure 4:
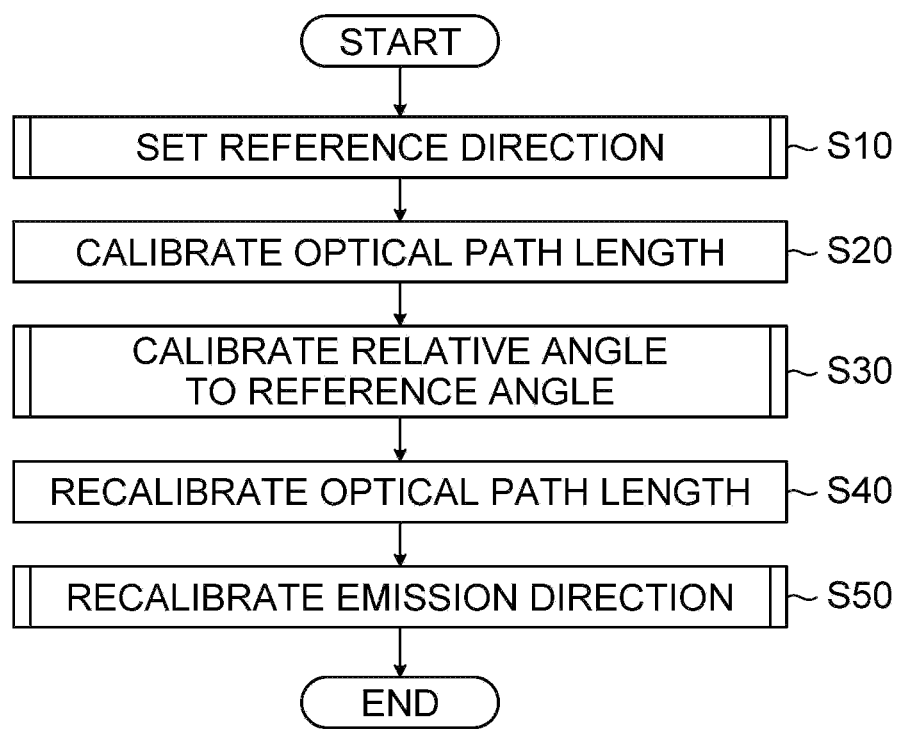
FIG. 4 is a flowchart indicating outline of a calibration method of an emission direction of measurement light of the optical rotation probe.
Figure 5:
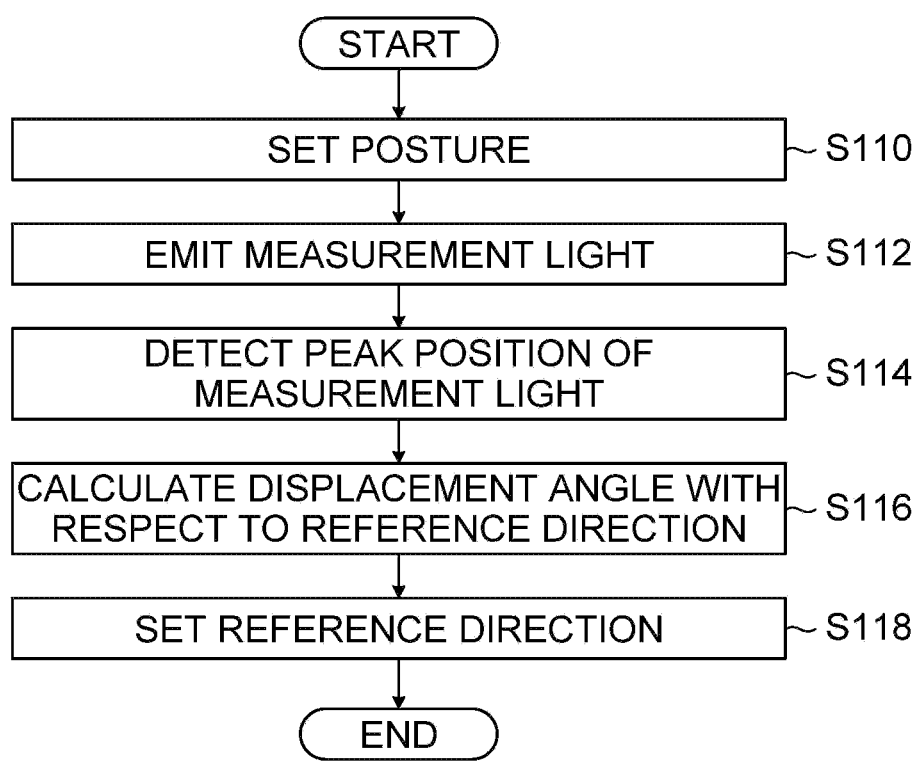
FIG. 5 is a flowchart indicating setting procedure of a reference direction.

A calibration method for the optical rotation probe 26 according to the first embodiment will be described next using FIG. 4 to FIG. 16. FIG. 4 is a flowchart indicating outline of a calibration method of the emission direction of the measurement light LA. While description will be provided below using a case where the X axis direction is set as a reference direction that is a reference of emission, the description does not intend to limit the reference direction.

First, as illustrated in FIG. 4, the reference direction of emission of the measurement light LA is set. Here, the reference direction of emission of the measurement light LA with respect to the X axis direction on the XY plane, in other words, a direction in which the rotation angle s of the optical rotation probe 26 with respect to the X axis direction becomes 0° is set (step S10).

<Setting of Reference Direction of Emission>

Figure 6:
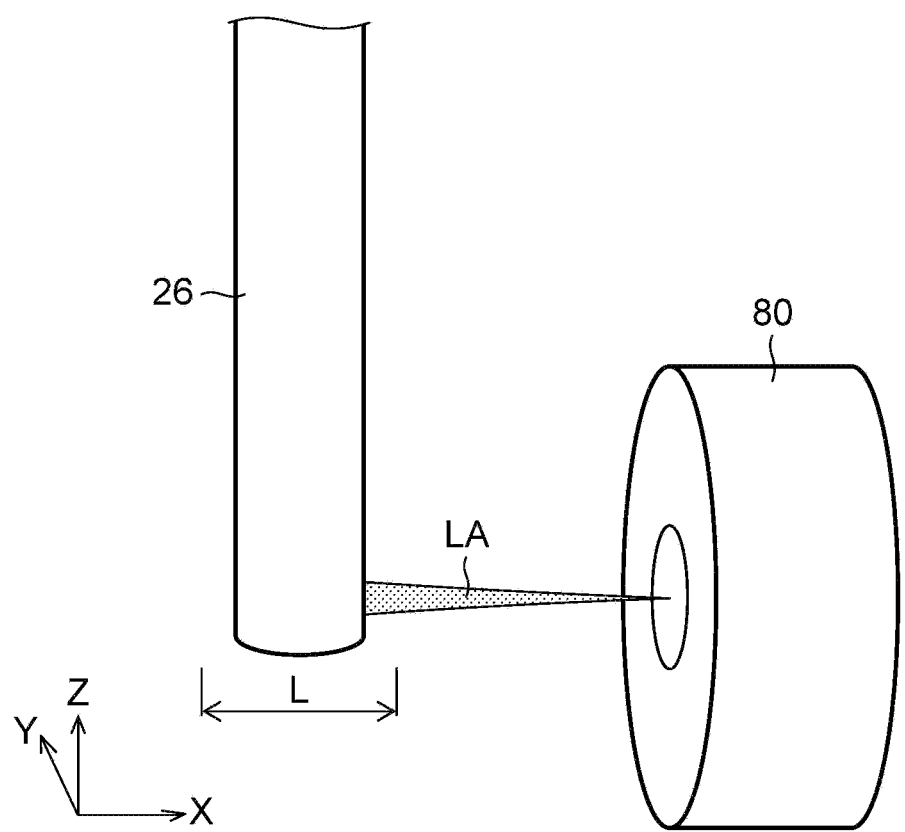
FIG. 6 is a view for explaining setting of the reference direction using a beam profiler.

The reference direction of emission of the measurement light LA is preferably set using, for example, a beam profiler 80. This enables setting of the emission direction of the measurement light LA with high accuracy. A method for setting the reference direction of emission on the XY plane using the beam profiler 80 will be described below with reference to FIG. 5. FIG. 6 illustrates an aspect where a position of a peak of intensity of the measurement light LA is detected using the beam profiler 80.

First, the control apparatus 72 drives the respective driving units (the XYZ driving units and the head driving unit) (not illustrated) to set the posture of the optical rotation probe 26 such that the shaft 62 of the optical rotation probe 26 becomes parallel to the Z axis direction (step S110). Subsequently, as illustrated in FIG. 6, the control apparatus 72 causes the optical rotation probe 26 to emit the measurement light LA toward the beam profiler 80 in the X axis direction (step S112). The control apparatus 72 measures intensity distribution of the measurement light LA using the beam profiler 80 while relatively moving the optical rotation probe 26 with respect to the beam profiler 80 by a distance L in the X axis direction (in a direction of an arrow in FIG. 6) and detects a displacement amount of the position (coordinate) of the peak of the intensity of the measurement light LA (step S114). An angle (displacement angle) at which the measurement light LA is displaced from the X axis direction on the XY plane is calculated based on the detection result in step S114 using the following expression (1) (step S116).

$$\theta = a\tan(Ly/L) \qquad (1)$$

Here, respective symbols mean as follows.

θ: a displacement angle of the emission direction of the measurement light LA with respect to the X axis direction L: a relative movement amount of the optical rotation probe 26 in the X axis direction Ly: a displacement amount of the position of the peak of the measurement light LA in the Y axis direction The control apparatus 72 updates numerical values of control software within the memory based on the displacement angle from the X axis direction calculated in step S114 and sets the reference direction in which the rotation angle s of the optical rotation probe 26 becomes 0° (step S118). By this means, setting of the reference direction for the XY plane is completed. For example, a user adjusts the angle (displacement angle) of the measurement light LA displaced from the X axis direction on the XZ plane using a mechanical adjustment mechanism (such as a gauge). Description regarding this setting will be omitted.

While in the above description, a method for setting the reference direction of emission of the measurement light LA using the beam profiler 80 has been described, the reference direction of emission of the measurement light LA may be visually set.

<Calibration of Optical Path Length>

Returning to FIG. 4, after the reference direction of emission of the measurement light LA is set in this manner (step S10), an optical path length of the measurement light LA of the optical rotation probe 26 is calibrated (step S20). The optical path length of the measurement light LA is calibrated by, for example, setting a length LS of the shaft 62 of the optical rotation probe 26 at a predetermined length. Here, if an intersection of a reflection surface of the prism mirror 66 and the optical path P is set at PX in FIG. 2, the length LS of the shaft 62 corresponds to a distance from the emission/incident end 44a of the optical fiber cable 44 to the intersection PX.

Figure 7:
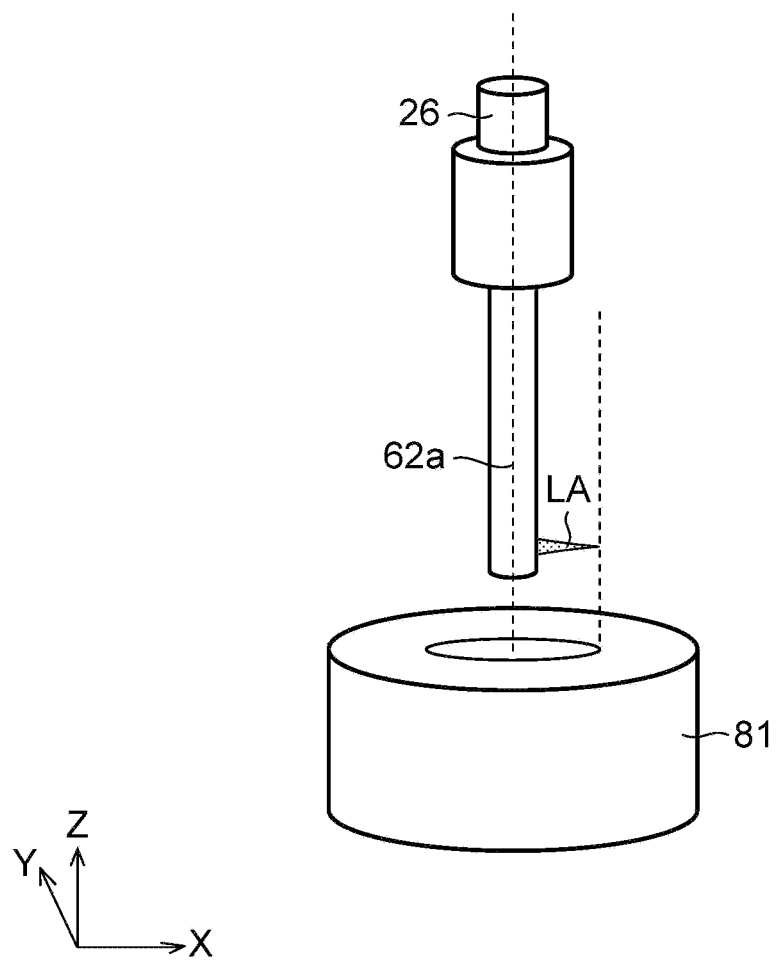
FIG. 7 is a view for explaining setting of an optical path length using a ring gauge.

Calibration of the optical path length of the measurement light LA using a ring gauge 81 will be described below as an example with reference to FIG. 7. As illustrated in FIG. 7, the control apparatus 72 rotates the optical rotation probe 26 around the longitudinal axis 62a to measure an internal diameter of the ring gauge 81 having a known internal diameter D. Here, a diameter of the ring gauge 81 to be used in calibration may preferably be about double a distance from the longitudinal axis 62a of the optical rotation probe 26 to a focal point of the measurement light LA.

Subsequently, the length LS of the shaft 62 of the optical rotation probe 26 is set based on the following expression (2) such that a measurement value of the internal diameter of the ring gauge 81 becomes equal to the known internal diameter D of the ring gauge 81. By this means, the optical path length of the measurement light LA is calibrated.

Length $LS$=actual length measurement value by optical rotation probe $26-D/2$ (2)

<Calibration Procedure of Relative Angle>

Figure 8:
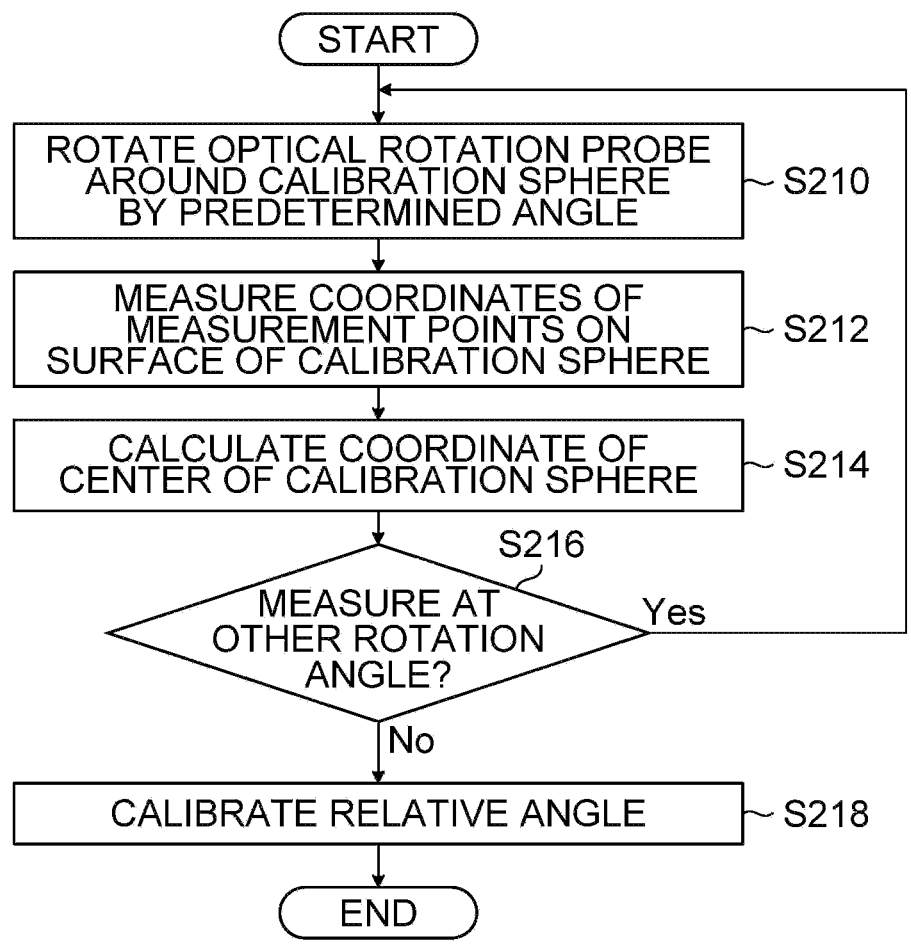
FIG. 8 is a flowchart indicating procedure of calibrating a relative angle.

Subsequently, returning to FIG. 4, after the optical path length of the measurement light LA is calibrated (step S20), a relative angle from a reference angle is calibrated (step S30). Here, a rotation angle s of the optical rotation probe 26 refers to a rotation angle in a rotation direction around the longitudinal axis 62a (hereinafter, also referred to as an S axis) of the optical rotation probe 26 (that is, a rotation angle around the longitudinal axis 62a in the emission direction of the measurement light LA). Further, a state where the emission direction of the measurement light LA of the optical rotation probe 26 is made to match the reference direction (X direction) in step S10 is set as a reference angle (s=0°), and a rotation angle when the optical rotation probe 26 rotates around the longitudinal axis 62a from the reference angle (that is, a relative angle from the reference angle) is represented as a "rotation angle s of the optical rotation probe". A calibration method of the relative angle using a calibration sphere 82 will be described below as an example with reference to FIG. 8 and FIG. 9. FIG. 8 is a flowchart indicating calibration procedure of the relative angle, and FIG. 9 is a view illustrating a positional relationship between the optical rotation probe 26 and the calibration sphere 82 in a case where the rotation angle s=0° and s=90° in calibration of the relative angle using the calibration sphere 82.

Figure 9:
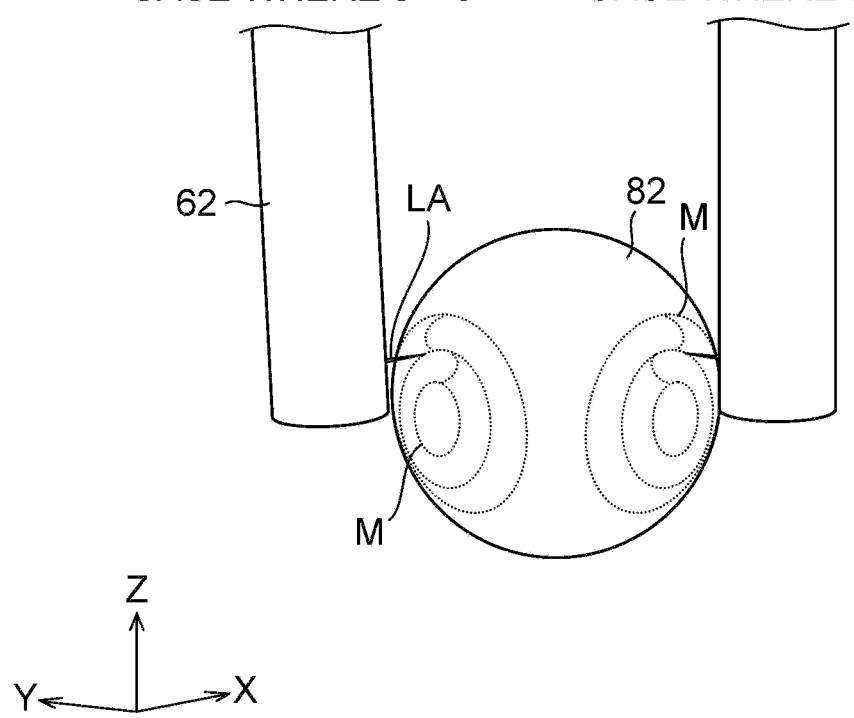
FIG. 9 is a view illustrating a positional relationship between the optical rotation probe and a calibration sphere in cases where a rotation angle is 0° and 90° in calibration of the relative angle using the calibration sphere.

As illustrated in FIG. 9, the control apparatus 72 rotates the optical rotation probe 26 around the longitudinal axis 62a of the optical rotation probe by a predetermined rotation angle s and aligns the focal point of the measurement light LA on a surface of the calibration sphere 82 as far as possible at the position (step S210). For example, in a case where the calibration sphere 82 is measured at a position where the rotation angle s is 90.0°, the control apparatus 72 rotates (autorotation which will be described later) the optical rotation probe 26 around the longitudinal axis 62a by 90.0° and further rotates (revolution which will be described later) the optical rotation probe 26 around the calibration sphere 82 by 90.0°. As a result of this, the optical rotation probe 26 and the calibration sphere 82 in a case where the rotation angle s=90° have a positional relationship as illustrated in FIG. 9. Here, the surface of the calibration sphere 82 is preferably located at a position of approximately ±focal depth/2 from the focal position of the measurement light LA.

Subsequently, the control apparatus 72 drives the X axis driving unit, the Y axis driving unit and the Z axis driving unit of the three-dimensional coordinate measurement apparatus 10 without altering the emission direction of the measurement light LA (that is, in a state where the optical rotation probe 26 is fixed without being rotated around the longitudinal axis 62a) to scan the surface of the calibration sphere 82 with the measurement light LA and measures three-dimensional coordinates of measurement points on the surface of the calibration sphere 82 at the rotation angle s (step S212). FIG. 9 illustrates the measurement points M on the calibration sphere 82 in cases where the rotation angle s=0° and s=90° as an example.

Subsequently, the control apparatus 72 calculates a three-dimensional coordinate of the center of the calibration sphere 82 from the three-dimensional coordinate values of the measurement points on the surface of the calibration sphere 82 for the rotation angle s (step S214). In this calculation, for example, a least-squares method using a known spherical diameter of the calibration sphere 82 may be used.

The control apparatus 72 repeats the processing from step S210 to step S214 for rotation angles s. For example, the processing from step S210 to step S214 is repeated for each rotation angle s while the rotation angle s of the optical rotation probe 26 is altered at intervals of 7.5° so that s=0°, 7.5°, 15.0°, . . . , 352.5° (step S216: No). Here, intervals of the rotation angle s of the optical rotation probe 26 during measurement are not limited to the intervals of 7.5°.

After the processing from step S210 to step S214 is performed for all the rotation angles s (step S216: Yes), further, the control apparatus 72 corrects numerical values of the control program within the memory such that the three-dimensional coordinate of the center of the calibration sphere 82 calculated for each rotation angle s matches the three-dimensional coordinate of the center of the calibration sphere 82 calculated for the rotation angle s=0° (step S218). Two correction methods will be described below as an example.

The first correction method is a method in which correction is performed using the measurement value obtained in step S210. For example, in an ideal case, the three-dimensional coordinate of the center of the calibration sphere 82 calculated for the rotation angle s=90° matches the three-dimensional coordinate of the center of the calibration sphere 82 calculated for the rotation angle s=0°, and thus, a vector component of the measurement light LA is (x, y, z)=(0, 1, 0).

In a case where the rotation angle s is not correctly 90° due to an error, for example, the control apparatus 72 corrects the vector component (x, y, z) of the measurement light LA to be (0.055, 0.992, 0.110) so that the three-dimensional coordinate of the center of the calibration sphere 82 calculated for the rotation angle s=90° matches the three-dimensional coordinate of the center of the calibration sphere 82 calculated for the rotation angle s=0°. For the rotation angle s with no measurement value, linear interpolation may be performed for rotation angles s with measurement values to calculate a correction value of the vector component of the measurement light LA.

The second correction method is a method in which correction is performed using a trigonometric function. In this method, an error Δs of the rotation angle of the emission direction of the measurement light LA with respect to the X axis direction within the XY plane (hereinafter, simply referred to as an S angle error) and an error angle Δφ of the emission direction of the measurement light LA with respect to the XY plane (hereinafter, simply referred to as an elevation angle error) are calculated from the following expression (3) and expression (4).

[Expression 1]

$$\Delta s = a\tan\left\{\frac{(F_0\cos(s) + x_i)\sin(s) - (F_0\sin(s) + y_i)\cos(s)}{(F_0\cos(s) + x_i)\cos(s) + (F_0\sin(s) + y_i)\sin(s)}\right\} \quad (3)$$

[Expression 2]

$$\Delta\varphi = a\tan\left\{\frac{z_i}{(F_0\cos(s) + x_i)\cos(s) + (F_0\sin(s) + y_i)\sin(s)}\right\} \quad (4)$$

Here, respective symbols mean as follows.
s: rotation angle (°) upon measurement of the calibration sphere
Δs: S angle error (°)
(error angle of the emission direction of the measurement light LA with respect to the X axis direction within the XY plane)
Δφ: elevation angle error (°)
(error angle of the emission direction of the measurement light LA with respect to the XY plane)
$F_0$: distance from the longitudinal axis 62a of the optical rotation probe 26 to the focal point
$(x_i, y_i, z_i)$: a central coordinate of the calibration sphere 82 measured for each rotation angle s
i: rotation angle upon measurement in step S210 (7.5°, 15°, . . . , 352.5°)

Figure 10:
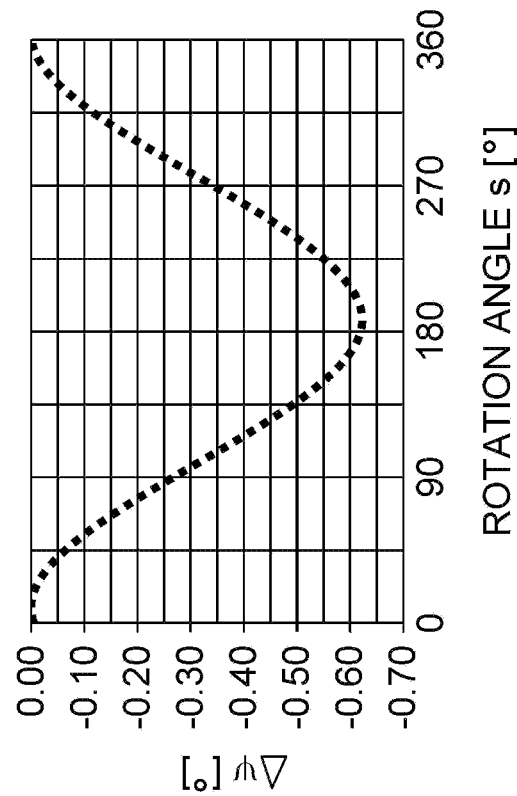
FIG. 10 is a graph indicating an S angle error with respect to the rotation angle and a graph indicating an elevation angle error with respect to the rotation angle, calculated in calibration of the relative angle using the calibration sphere.
Figure 10:
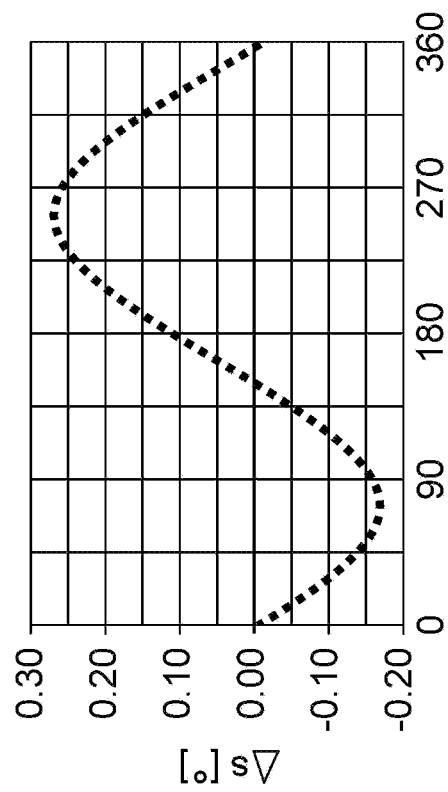

A reference numeral 10A in FIG. 10 is a graph of the S angle error Δs calculated for each rotation angle s based on the above expression (3), and a reference numeral 10B is a graph of the elevation angle error Δφ calculated for each rotation angle s based on the above expression (4). The control apparatus 72 updates numerical value of the control software stored in the memory based on the calculated S angle error Δs and the elevation angle error Δφ.

<Recalibration of Optical Path Length>

Returning to FIG. 4, after the relative angle is calibrated in step S30, the optical path length of the measurement light LA is recalibrated (step S40). Procedure of recalibrating the optical path length is the same as that in step S20, and thus, description will be omitted.

<Recalibration of Reference Direction of Emission>

Further, the reference direction of emission set in step S10 is recalibrated (step S50). While the reference direction is set in step S10, as will be described later using FIG. 16, in this setting, displacement occurs from the intended reference direction of emission (in this example, the X axis direction) due to its accuracy, which provides an error to the reference angle of the S angle. Recalibration of the emission direction is one of the features of the presently disclosed subject matter. Here, the S angle means the rotation angle of the emission direction of the measurement light LA with respect to the X axis direction (reference direction) within the XY plane.

Figure 11:
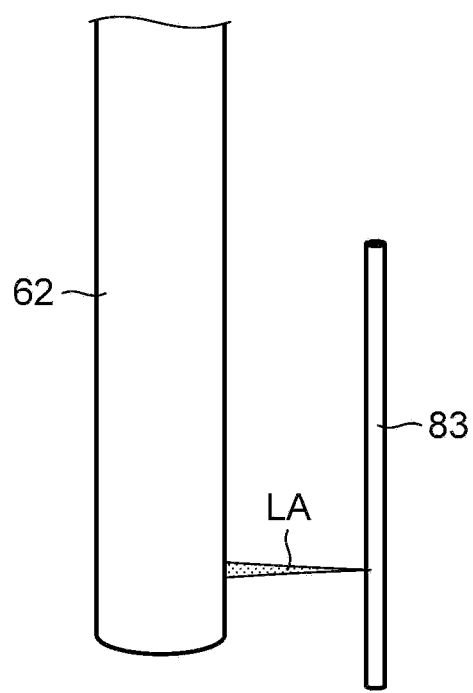
FIG. 11 is a perspective view illustrating a positional relationship between the optical rotation probe and a pin gauge upon measurement of an adjustment error of the emission direction.
Figure 12:
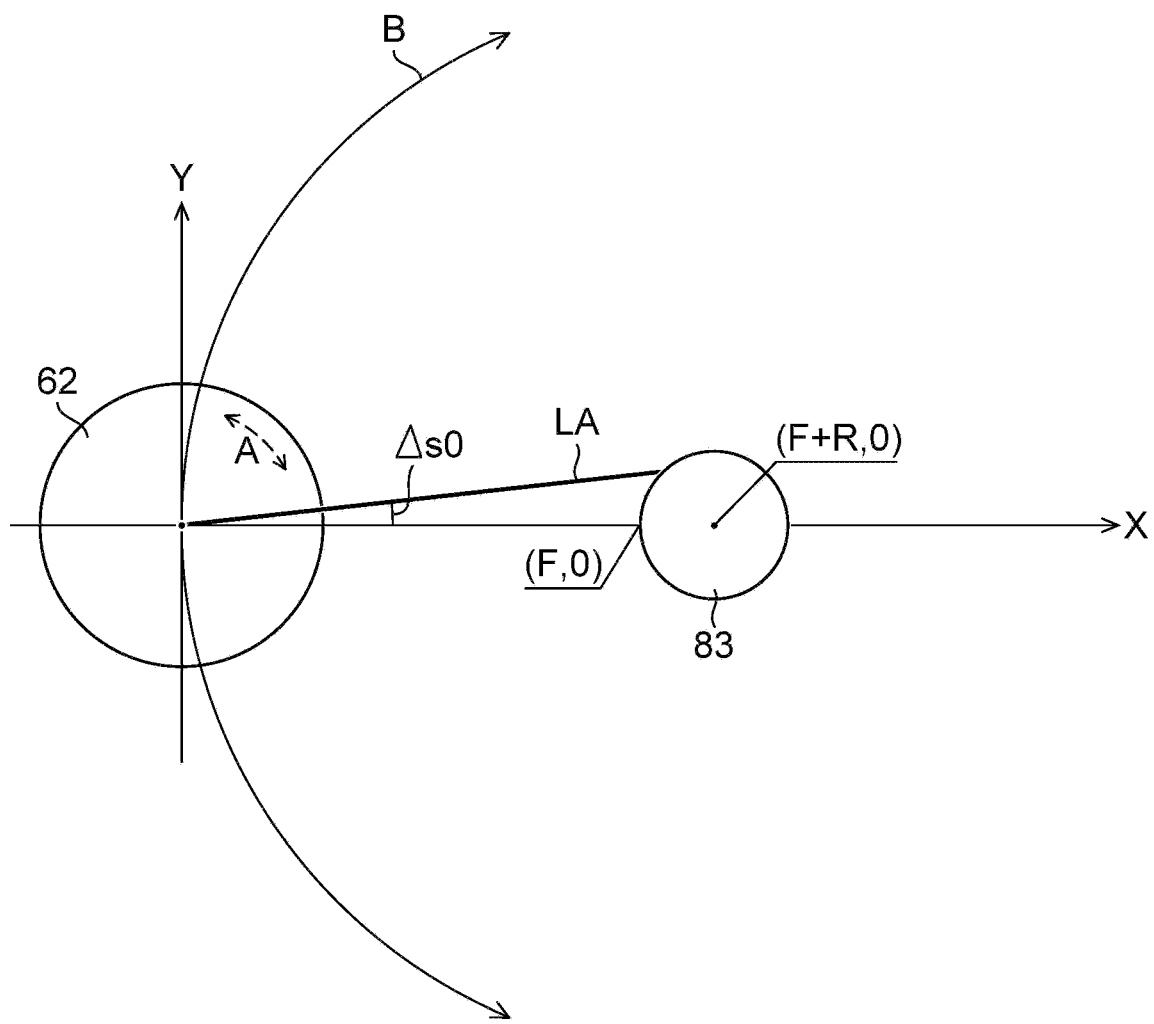
FIG. 12 is a view illustrating a positional relationship between the optical rotation probe and the pin gauge on an XY plane upon measurement of the adjustment error of the emission direction.

Principle of recalibration of the emission direction in step S50 will be described below. In the present embodiment, as an example, the adjustment error of the emission direction is measured using a cylindrical pin gauge 83 (corresponding to the reference object in the presently disclosed subject matter) having a known radius R, and the emission direction is recalibrated based on the measured adjustment error. FIG. 11 and FIG. 12 are respectively a perspective view and an XY plan view illustrating a positional relationship between the optical rotation probe 26 and the pin gauge 83 upon measurement of the adjustment error of the emission direction (which will be described in detail later). As illustrated in FIG. 11, the longitudinal axis of the pin gauge 83 is disposed in parallel to the longitudinal axis 62a of the optical rotation probe 26. Then, as illustrated in FIG. 12, if the radius R of the pin gauge 83 is measured in a state where the emission direction of the measurement light LA has a reference angle error Δs0 of the S angle with respect to the reference direction (in this example, the X axis direction) on the XY plane, an error ΔR occurs in the measurement value. This error ΔR can be expressed using the following expression (5) as a function of the reference angle error Δs0 of the S angle.

[Expression 3]

$$\Delta R = (a^2 + b^2)^{0.5} - F \quad (5)$$

Here, F is a focal distance from the longitudinal axis 62a of the optical rotation probe 26, and symbols a and b can be expressed using the following expressions (6) and (7).

[Expression 4]

$$a = \frac{F + R - \sqrt{(F+R)^2 - \{1 + \tan^2(\Delta s0)\}[R^2 - \{R - (F+R)^2\}]}}{1 + \tan^2(\Delta s0)} \quad (6)$$

[Expression 5]

$$b = a \times \tan(\Delta s0) \quad (7)$$

Figure 13:
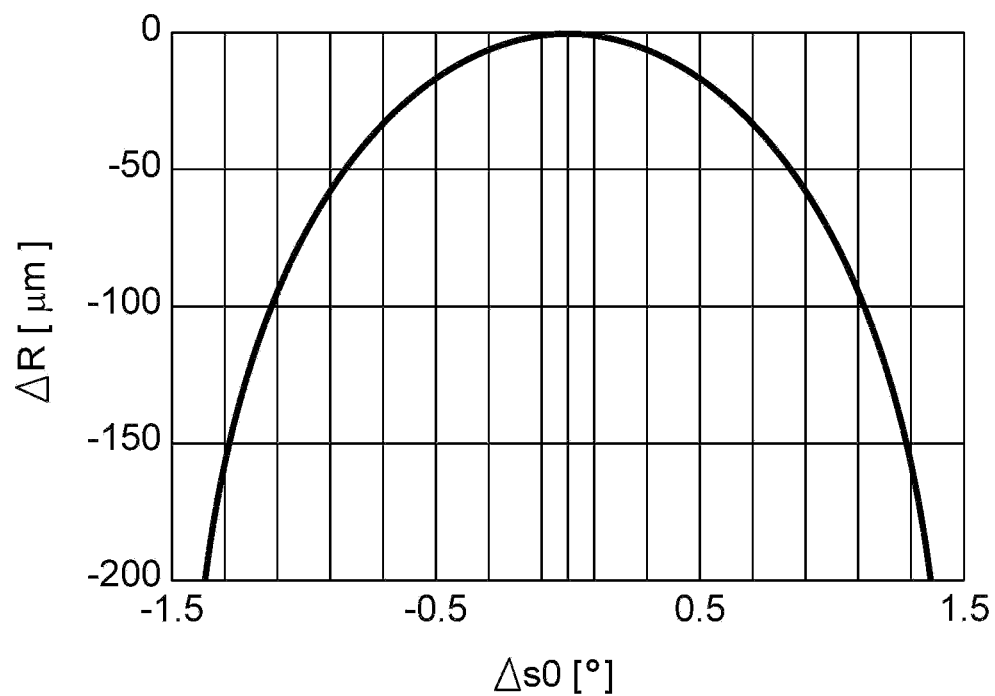
FIG. 13 is a graph indicating a theoretical value of a measurement error of a radius of the pin gauge with respect to a reference angle error of an S angle of the optical rotation probe.

FIG. 13 indicates a graph of an error of a radius calculated based on the expression (5) in a case where the radius R=0.25 mm, and the distance F=10.0 mm. FIG. 13 indicates the reference angle error Δs0 (°) of the S angle on the horizontal axis and indicates the error ΔR (μm) of the radius on the vertical axis.

In the presently disclosed subject matter, the angle of the reference direction is temporarily changed by updating values of the control software within the memory with an angle obtained by intentionally displacing the calibrated emission direction of the measurement light LA of the optical rotation probe 26 by a minute angle Δs1 with respect to the reference direction set in step S10. The radius R of the pin gauge 83 is measured in a state where the reference angle is displaced by the minute angle Δs1 from the setting in step S10, and the error ΔR of the radius R is calculated. If the emission direction of the measurement light LA of the optical rotation probe 26 does not have the reference angle error Δs0 of the S angle, the calculated error ΔR should match the theoretical ΔR. Thus, in the presently disclosed subject matter, the reference angle error Δs0 of the S angle of the calibrated emission direction of the optical rotation probe 26 with respect to the reference direction is calculated as the adjustment error based on a difference between the calculated error ΔR and the theoretical ΔR. By recalibrating the emission direction based on the calculated adjustment error, calibration accuracy of the optical rotation probe 26 is improved, and eventually, the measurement error by the optical rotation probe 26 is reduced.

Figure 14:
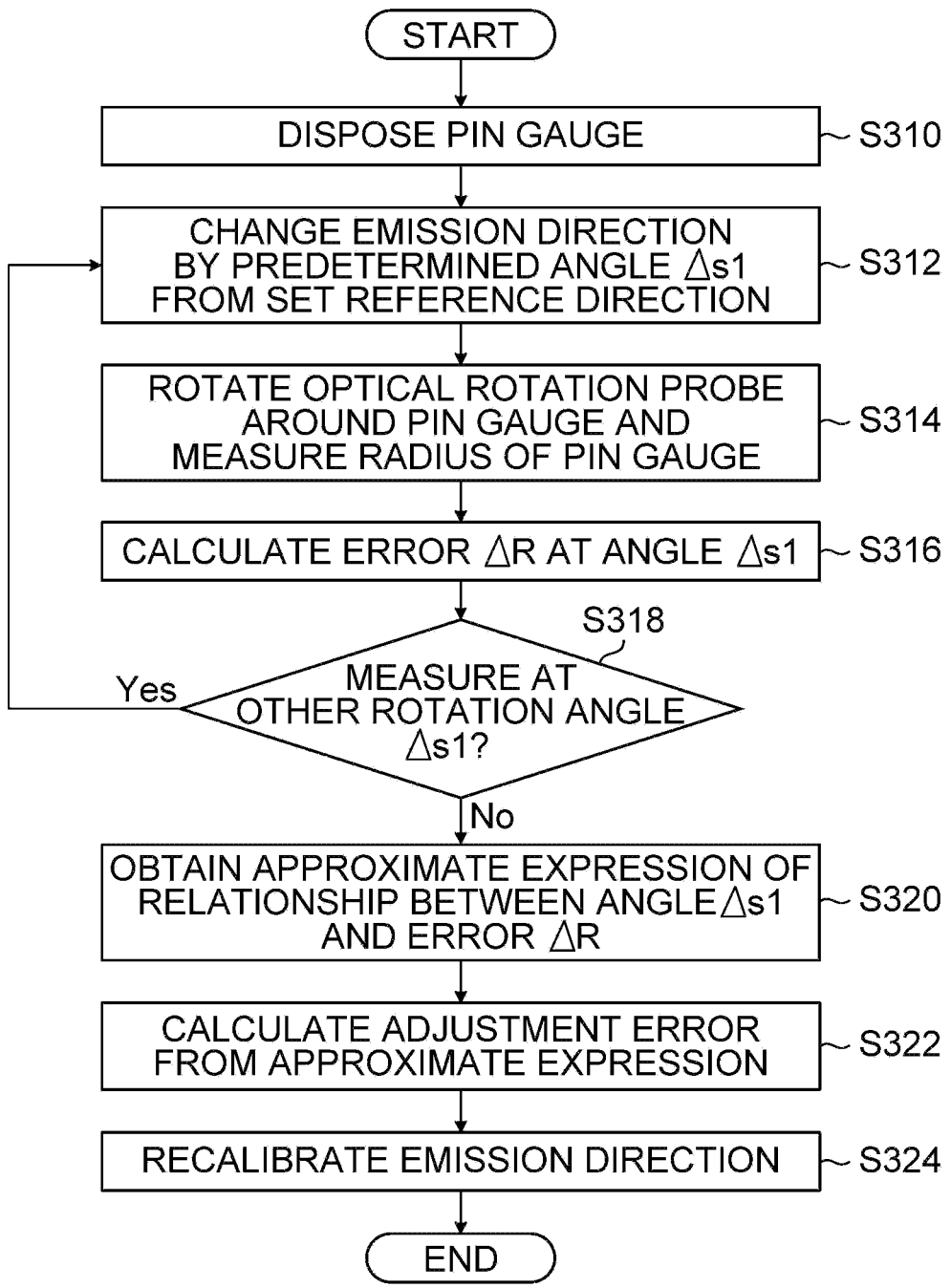
FIG. 14 is a flowchart indicating a recalibration method of the emission direction according to a first embodiment.

A recalibration method of the emission direction will be described below using FIG. 11 to FIG. 16. FIG. 14 is a flowchart indicating procedure of recalibrating the emission direction. As indicated in FIG. 14, first, the pin gauge 83 is disposed so as to achieve a predetermined positional relationship with the optical rotation probe 26 (step S310). The radius R of the pin gauge 83 is preferably approximately from ten times to tens of times of a beam diameter of the measurement light LA. FIG. 11 and FIG. 12 are views respectively illustrating a positional relationship between the optical rotation probe 26 and the pin gauge 83 upon measurement of the adjustment error of the emission direction. As illustrated in FIG. 11, the pin gauge 83 is disposed in parallel to the longitudinal axis 62a of the optical rotation probe 26. Here, preferably, a distance between the optical rotation probe 26 and the pin gauge 83 is set such that a distance between the optical rotation probe 26 and the pin gauge 83 is constant, and a surface of the pin gauge 83 is preferably located in a focal distance of the measurement light LA.

More specifically, the distance between the optical rotation probe 26 and the pin gauge 83 is preferably set such that the surface of the pin gauge 83 is located at a position of approximately ±focal depth/2 from the focal position of the measurement light LA. In the examples illustrated in FIG. 11 and FIG. 12, a distance between the longitudinal axis 62a of the optical rotation probe 26 and the measurement surface of the pin gauge 83 is equal to the focal distance F.

Further, in the example in FIG. 12, the longitudinal axis 62a of the optical rotation probe 26 is disposed at the origin on the XY plane, and the center C of a circle of the cross-section of the pin gauge 83 is disposed on the X axis.

Through the calibration procedure from step S10 to step S40 described above, ideally, the optical rotation probe 26 is adjusted such that the emission direction of the measurement light LA matches the X axis direction that is the reference direction at the rotation angle s=0°. Thus, ideally, the measurement light LA is expected to be emitted toward an apex of the pin gauge 83 perpendicularly to the axial direction of the pin gauge 83 at the rotation angle of the optical rotation probe 26 s=0°.

After the optical rotation probe 26 and the pin gauge 83 are disposed in such a positional relationship, the control apparatus 72 sets an angle obtained by changing the optical rotation probe 26 around the longitudinal axis 62a (S axis) by a predetermined minute angle Δs1 from the reference angle set in step S10 by the head driving unit (not illustrated) of the measurement head 24 as a temporal reference angle (step S312). The change of the optical rotation probe 26 in this event corresponds to movement indicated with a dashed arrow A in FIG. 12.

Subsequently, the control apparatus 72 emits the measurement light LA from the optical rotation probe 26 toward the pin gauge 83 while moving the optical rotation probe 26 along a rotation trajectory (in a direction of a solid arrow B in FIG. 12) centering the pin gauge 83 by controlling the XYZ driving units of the three-dimensional coordinate measurement apparatus 10 and continuously rotating the optical rotation probe 26 around the longitudinal axis (rotation axis) 62a (that is, continuously varying the rotation angle s of the optical rotation probe 26) and measures the radius R of the pin gauge 83 (step S314).

In other words, the control apparatus 72 brings rotational movement (revolution movement) of the optical rotation probe 26 centering around the pin gauge 83 in synchronization with rotational movement (autorotation movement) around the longitudinal axis (rotation axis) 62a of the optical rotation probe 26 and emits the measurement light LA from the optical rotation probe 26 toward the pin gauge 83 perpendicularly with respect to the longitudinal axis direction of the pin gauge 83 while keeping a constant distance between the optical rotation probe 26 and the pin gauge 83. In this case, measurement is preferably performed after the optical rotation probe 26 is rotated around the pin gauge 83 by one or more revolutions (equal to or greater than 360°). Further, the apex of the pin gauge 83 is preferably irradiated with the measurement light LA emitted from the optical rotation probe 26.

Subsequently, the control apparatus 72 calculates the error ΔR of the radius R of the pin gauge 83 at the predetermined minute angle Δs1 based on the measurement result obtained in step S314 (step S316). Here, the radius R of the pin gauge 83 is known, and calculation of the error ΔR is simple calculation of a difference, and thus, description will be omitted.

The control apparatus 72 repeats measurement of the radius R of the pin gauge 83 and calculation of the error ΔR while altering the reference angle of rotation around the longitudinal axis 62a of the optical rotation probe 26 by a minute angle Δs1 (step S318: Yes). After the processing from step S312 to S316 is repeated the number of times sufficient to obtain an approximate expression (step S318: No), the control apparatus 72 further obtains an approximate expression indicating a relationship between the minute angle Δs1 and the error ΔR (step S320). Preferably, the control apparatus 72 obtains a quadratic polynomial using the least-squares method.

Figure 15:
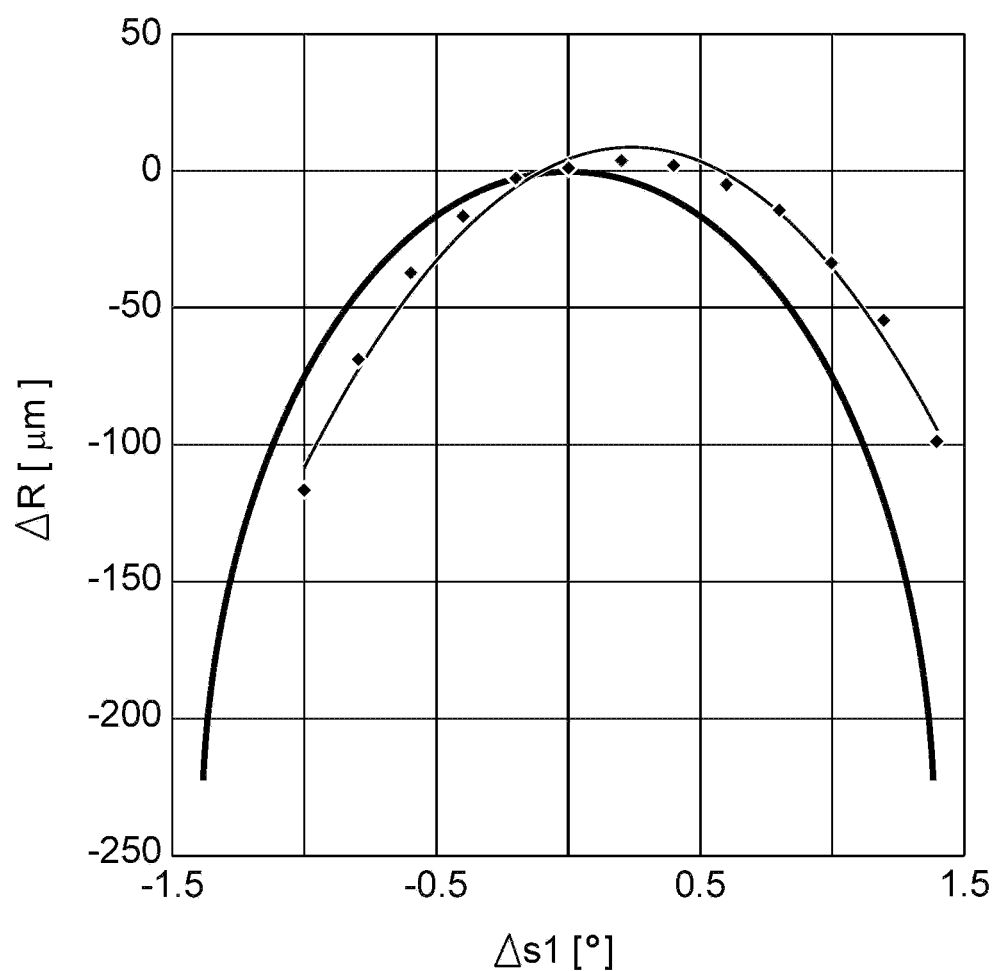
FIG. 15 is a graph indicating a theoretical value of an error and a measurement value of the error with respect to a minute angle of rotation of the optical rotation probe in the first embodiment.

FIG. 15 indicates an example of a graph in which the error ΔR calculated from the measurement value in step S314 is plotted in a superimposed manner on the graph in FIG. 13, the graph indicating the minute angle Δs1 on the horizontal axis and indicating the error ΔR on the vertical axis. In FIG. 15, a rhombic indicates the error ΔR calculated from the measurement value, and a thin solid line indicates the approximate expression obtained using the least-squares method. The approximate expression indicated in FIG. 15 is as follows.

$$\Delta R = -76.044\Delta s1^2 + 35.86\Delta s1 + 4.4608$$

Further, a thick solid line indicates a theoretical error ΔR. As indicated in FIG. 15, compared to the graph of the theoretical error ΔR, the graph of the error ΔR calculated from the measurement value is displaced in the vertical axis direction and extends in a width in the horizontal axis direction. Here, displacement in the vertical axis direction may be caused by a uniform length measurement error occurring at the wavelength swept light source 28 of the measurement light LA. Extension in the width in the horizontal axis direction may be caused by extension of the beam diameter of the measurement light LA as a result of the measurement position being displaced from the focal position of the measurement light LA.

Subsequently, the control apparatus 72 calculates the adjustment error of the emission direction of the measurement light LA from the approximate expression obtained in step S320 (step S322). For example, the following quadratic polynomial (8) using the least-squares method can be transformed to expression (9).

$$\Delta R == A\Delta s1^2 + B\Delta s1 + C \qquad (8)$$

[Expression 6]

$$\Delta R = \left(\Delta s1 + \frac{B}{2A}\right)^2 + \frac{4AC - B^2}{4A} \qquad (9)$$

From the above, the control apparatus 72 can perform calculation assuming that the reference angle error Δs0 (adjustment error) of the optical rotation probe 26 is the minute angle Δs1 when ΔR in the expression (9) has an extreme value, and is "−B/2A" (°). This adjustment error "−B/2A" (°) corresponds to an error of the emission direction of the measurement light LA remaining after calibration from step S10 to step S40.

Specifically, in a case of the graph indicated in FIG. 15, the control apparatus 72 can obtain 35.86/(2×76.044) =0.236° as the reference angle error Δs0 (adjustment error) from the approximate expression "ΔR=−76.044Δs1$^2$+ 35.86Δs1+4.4608". The control apparatus 72 recalibrates the emission direction by updating the numerical values of the control software stored in the memory again based on the calculated adjustment error (step S324).

According to the calibration method for the optical rotation probe 26 in the present embodiment as described above, the emission direction of the measurement light LA emitted from the optical rotation probe 26 can be calibrated with high accuracy. It is therefore possible to reduce the measurement error of the optical rotation probe 26, which eventually makes it possible to reduce the measurement error of the three-dimensional coordinate measurement apparatus 10 equipped with the optical rotation probe 26. By this means, it is possible to measure a shape with a great curvature of a local portion of the object to be measured with high accuracy.

<Advantages of Recalibration of Emission Direction According to the Present Embodiment>

While the calibration method of the presently disclosed subject matter can improve calibration accuracy of the optical rotation probe 26 as described above, the calibration method of the present embodiment further has the following advantages.

First, to measure a fine shape, it is necessary to make the beam diameter of the measurement light LA smaller. While at the focal position of the measurement light LA, a beam diameter of several micrometers to several tens of micrometers can be obtained, if the measurement position is deviated from the focal position of the measurement light, the beam diameter of the measurement light LA becomes larger. Further, there is a case where the beam diameter of the measurement light LA becomes larger due to influence of white noise, or the like.

Figure 16:
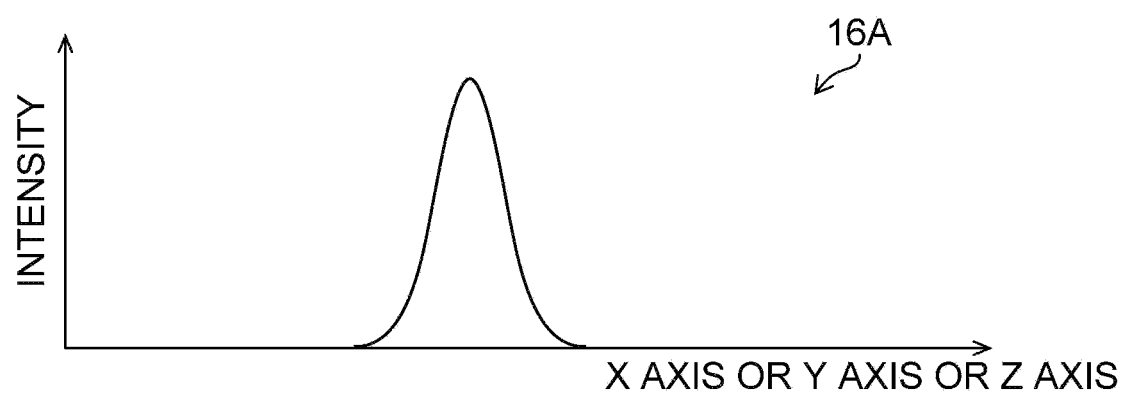
FIG. 16 is a view for explaining a difference in intensity distribution of the measurement light occurring by a difference in a beam diameter.
Figure 16:
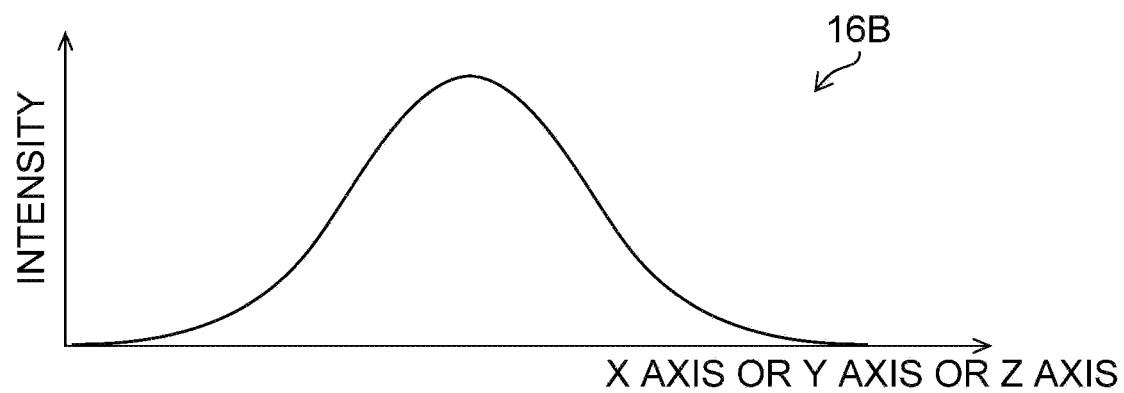

A reference numeral 16A in FIG. 16 designates intensity distribution of the measurement light LA obtained in a case where the beam diameter is small, and a reference numeral 16B designates intensity distribution of the measurement light LA obtained in a case where the beam diameter is large. While the intensity distribution of the measurement light LA is measured upon calibration of the measurement light LA, in a case where the beam diameter of the measurement light LA is large as designated with the reference numeral 16B in FIG. 16, a gradient of intensity becomes small in the vicinity of the peak, which makes it difficult to detect a position of the peak of the intensity of the measurement light LA with high accuracy. Thus, in related art, there is a problem that the reference direction (reference of the rotation angle of the optical rotation probe) of emission of the measurement light LA of the optical rotation probe 26 cannot be set with high accuracy.

For example, in a case where the focal distance of the imaging lens 64 of the optical rotation probe 26 is 18 mm, and the beam diameter of the measurement light LA is 13 µm, at a measurement position displaced from the focal distance by 0.5 mm, the beam diameter becomes 150 µm. In this event, setting accuracy of the position of the peak of the intensity of the measurement light LA is approximately 3 µm, and calibration accuracy of the emission direction is approximately 0.3°. In a case where a distance from the longitudinal axis 62a (optical axis of the measurement light LA) of the optical rotation probe 26 to the focal distance is 10 mm, an error of the measurement position becomes 50 µm.

In related art, there is a problem that a shape with a great curvature of a local portion of the object to be measured cannot be measured with high accuracy due to such a large error. On the other hand, in the present embodiment, the radius R of the pin gauge 83 is measured in a state where the calibrated emission direction of the measurement light LA of the optical rotation probe 26 is intentionally displaced by a minute angle Δs1 with respect to the reference angle set in step S10, and the error ΔR of the radius R is calculated.

As illustrated in FIG. 15, in a case where the beam diameter of the measurement light LA extends as a result of the measurement position being displaced from the focal position of the measurement light LA, a graph of the calculated error ΔR extends in the horizontal axis direction, but the graph maintains symmetry in the horizontal axis direction. Thus, extension in the width in the horizontal axis direction of the graph does not affect the calculation result of the adjustment error based on the approximate expression of the calculated error ΔR. Thus, in the present embodiment, even in a case where the beam diameter of the measurement light LA extends, the emission direction of the measurement light LA can be calibrated with high accuracy based on the calculation result of the adjustment error.

In a similar manner, even in a case where a uniform length measurement error remains in the wavelength swept light source 28 of the measurement light LA after calibration, as indicated in FIG. 15, the graph of the error ΔR calculated from the measurement value is only displaced in the vertical axis direction compared to the graph of the theoretical error ΔR, and does not affect the calculation result of the adjustment error based on the approximate expression of the calculated error ΔR. Thus, in the present embodiment, even in a case where a uniform length measurement error occurs at the wavelength swept light source 28 of the measurement light LA, it is possible to calibrate the emission direction of the measurement light LA with high accuracy.

[Recalibration Method of Emission Direction According to Second Embodiment]

Figure 17:
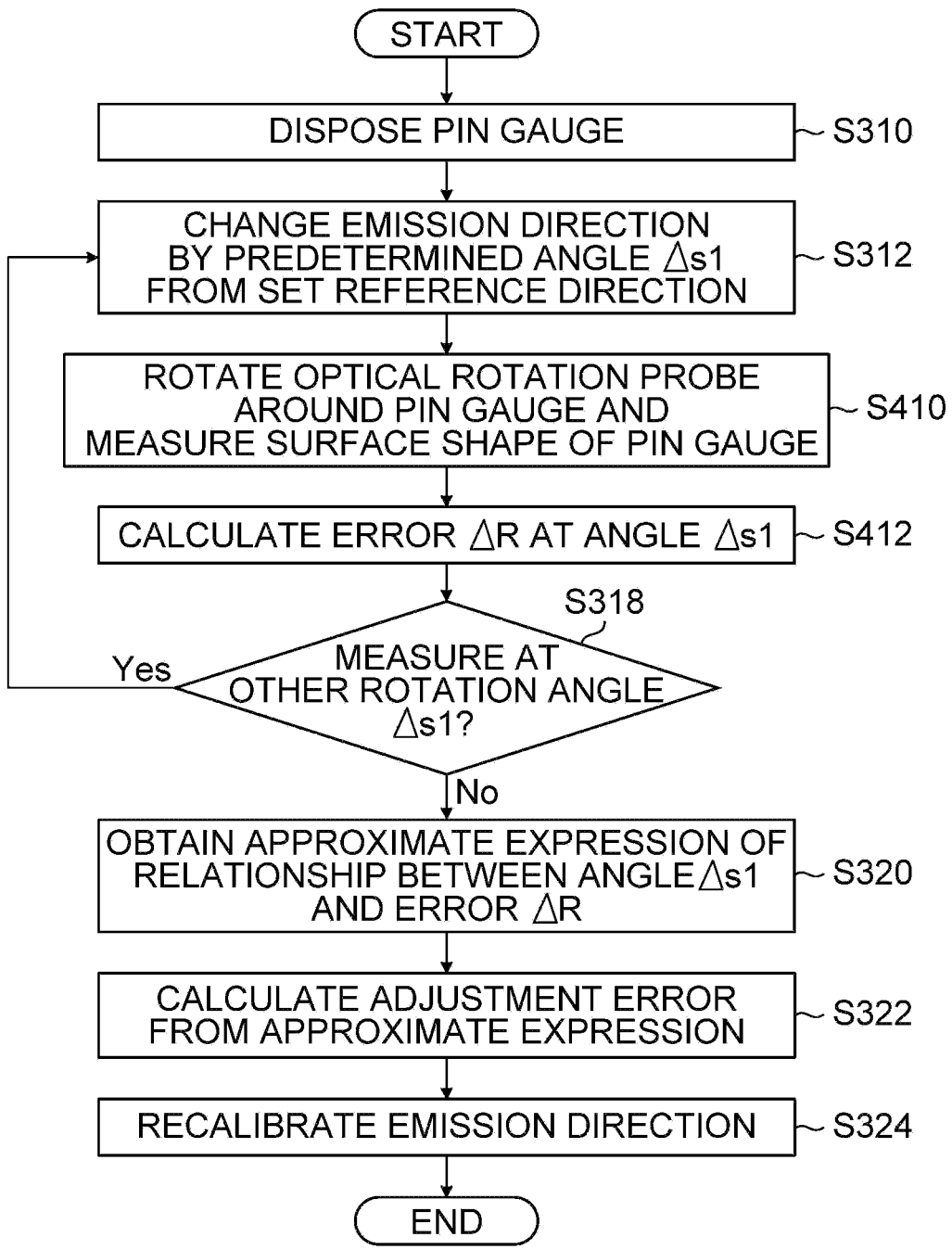
FIG. 17 is a flowchart indicating a recalibration method of an emission direction according to a second embodiment.

In the above description, the reference angle error Δs0 of the S angle is calculated by measuring the radius R of the pin gauge 83 having a known radius. However, a surface shape of the pin gauge 83 may be measured instead of measuring the radius R of the pin gauge 83. FIG. 17 indicates a recalibration method of the emission direction of the measurement light LA according to the second embodiment. As illustrated in FIG. 17, while the recalibration method of the emission direction in the second embodiment is substantially the same as the flowchart indicated in FIG. 14, the recalibration method is different from the flowchart in FIG. 14 in that processing in step S410 and S412 is performed in place of steps S314 and S316. The difference will be described below.

Figure 18:
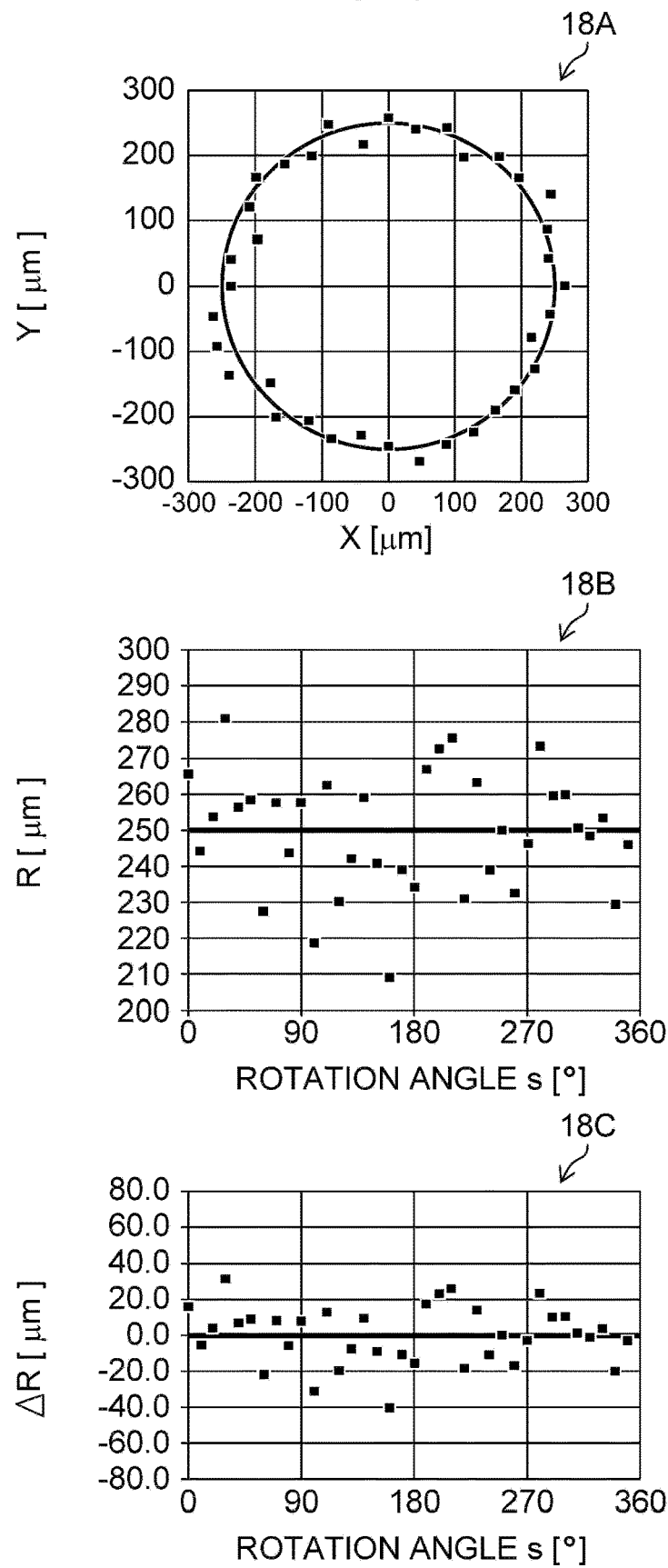
FIG. 18 is a view for explaining a calibration method of an adjustment error according to the second embodiment.

In the second embodiment, in step S410, instead of the radius R of the pin gauge 83, the surface shape of the pin gauge 83 is measured in a state where the reference angle of the S angle the optical rotation probe 26 around the longitudinal axis 62a (S axis) is changed by a minute angle Δs1 from the setting in step S10. A reference numeral 18A in FIG. 18 designates a graph in which the measurement result of the surface shape at a certain minute angle Δs1 is plotted on an XY coordinate.

Subsequently, in step S412, the control apparatus 72 calculates standard deviation σ (ΔR) of the error ΔR of the radius R of the pin gauge 83 based on the measurement value at each minute angle Δs1. An example of a method for calculating the standard deviation σ (ΔR) for a certain minute angle Δs1 will be specifically described below with reference to the graph indicated in FIG. 18. First, the control apparatus 72 calculates an approximate value of the radius R of the pin gauge 83 by approximating the measurement result of the surface shape using the least-squares method. In a graph designated with the reference numeral 18A, an approximate value of the radius R is designated with a thick solid circle. The reference numeral 18B designates a graph obtained by converting the graph of the XY coordinate of each measurement point designated with the reference numeral 18A into the measurement value (vertical axis) of the radius R with respect to the rotation angle (horizontal axis) centering around the center C of the pin gauge 83. Subsequently, the control apparatus 72 calculates the error ΔR that is a difference between the approximate value of the radius R and the measurement value of the radius R. A reference numeral 18C designates a graph of the error ΔR (vertical axis) with respect to the rotation angle s (horizontal axis) centering around the center C of the pin gauge 83. Further, the control apparatus 72 calculates the standard deviation σ (ΔR) of the error ΔR from variation of the obtained error ΔR and further calculates ±2σ that is a range including about 95% of all the measurement points in normal distribution of the error ΔR as a shape error. In a case of the graphs designated with the reference numerals 18A to 18C in FIG. 18, the shape error (±2σ) is 60 μm. The control apparatus 72 performs such calculation of the shape error for different minute angles Δs1.

Figure 19:
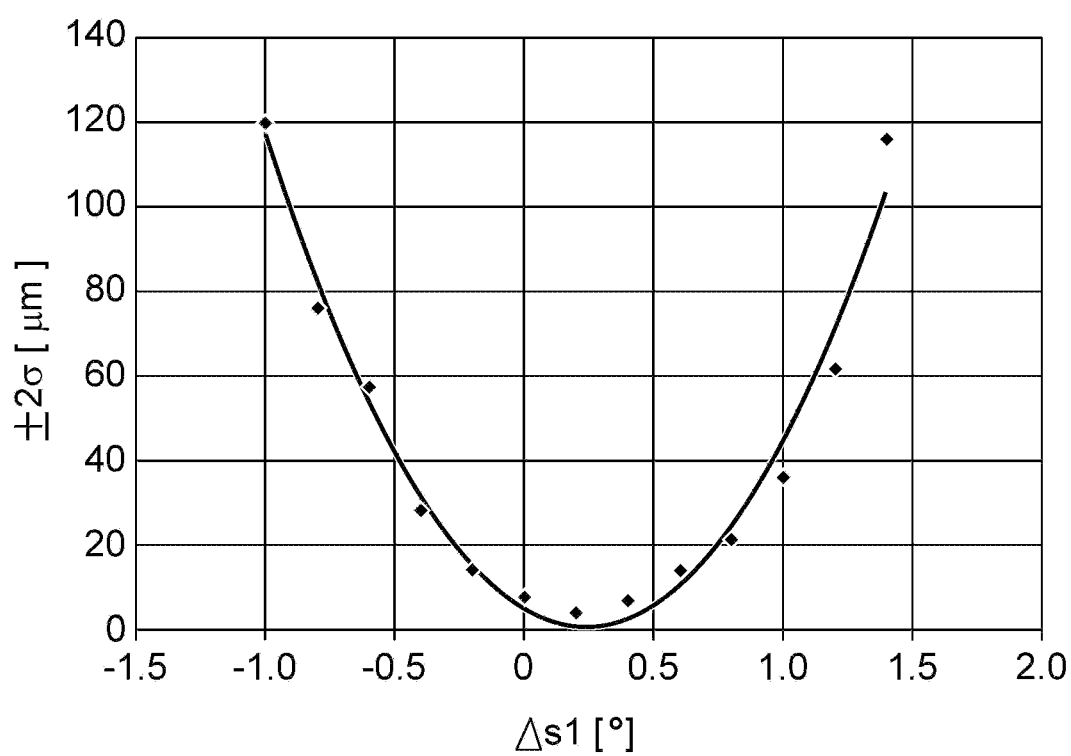
FIG. 19 is a graph indicating a shape error with respect to a minute angle of rotation of an optical rotation probe in the second embodiment.

The subsequent procedure is similar to that in the first embodiment. FIG. 19 indicates a graph plotted with the minute angle Δs1 of rotation around the longitudinal axis 62a of the optical rotation probe 26 on the horizontal axis and the shape error (±2σ) calculated in step S314 on the vertical axis. For example, if the graph in FIG. 19 is approximated to a quadratic polynomial using the least-squares method, "±2σ=−76.508Δs1²+36.141Δs1+4.6607" (see the solid line graph in FIG. 19).

In this manner, also in the second embodiment in which the surface shape is measured, results substantially the same as those obtained in the first embodiment in which the radius R is measured, can be obtained. By changing the reference angle of the optical rotation probe 26 by the minute angle Δs1 from the setting in step S10, in a case where the measurement light LA does not perpendicularly hit the measurement point on the pin gauge 83, a width of the interference signal of the measurement light LA and the reflected light LB becomes wide. In a case of the second embodiment in which the shape measurement is performed, this causes an error, and thus, a difference occurs between the approximate expression in the first embodiment and the approximate expression in the second embodiment.

Also in the second embodiment, in a similar manner to the first embodiment, the calibration accuracy can be improved, and the measurement error of the optical rotation probe 26 can be reduced, which eventually makes it possible to reduce the measurement error of the three-dimensional coordinate measurement apparatus 10 equipped with the optical rotation probe 26.

[Recalibration Method of Emission Direction According to Third Embodiment]

In the above first and second embodiments, the emission direction is recalibrated using the radius R of the cylindrical pin gauge 83. Here, the radius R of the pin gauge 83 is, for example, approximately from ten times to tens of times of the beam diameter of the measurement light LA. For example, in a case where the beam diameter is 13 μm, the radius R of the pin gauge 83 is approximately from 130 μm to several millimeters. It is not easy to manually position the pin gauge 83 having such a small radius R for measurement.

Figure 20:
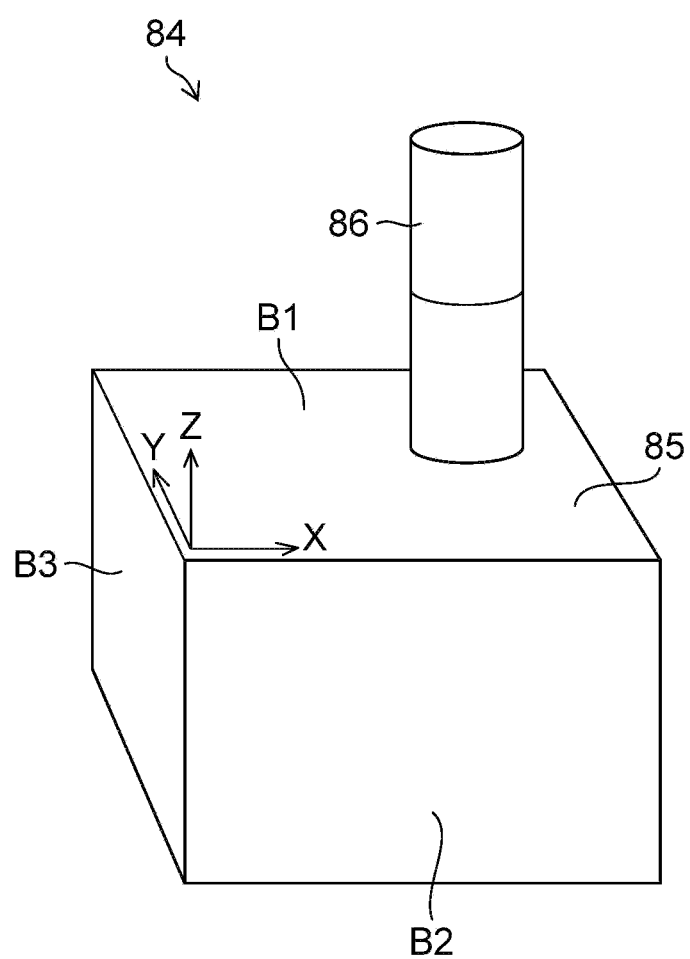
FIG. 20 is a perspective view of a jig according to a third embodiment.

Thus, in place of the pin gauge 83, a jig 84 in which a pin gauge 86 is provided to perpendicularly (in the Z axis direction) stand on a cuboid block 85 as illustrated in FIG. 20 may be used. Here, perpendicularity of the pin gauge 86 may not be strictly required. For example, in a case of the pin gauge 86 having the radius R of 0.25 mm, if an inclination angle with respect to the XY plane is less than 1°, influence provided to the measurement error of the radius R by the inclination angle is 0.03 μm, which is small enough to be used in calibration.

A recalibration method in a case where this jig 84 is used will be described below. First, before recalibration indicated in FIG. 14 is performed, a position of the pin gauge 86 on the block 85 in the jig 84 is measured. Normally, it is enough if this measurement is performed once for the jig 84, and thereafter, a numerical value obtained through this measurement is repeatedly used in recalibration.

First, a design coordinate (x0, y0, z0) of the center (longitudinal axis) of the pin gauge 86 is assumed. Subsequently, three surfaces B1, B2 and B3 of the block 85 of the jig 84 are measured, a workpiece coordinate system (XYZ orthogonal coordinate system) of the block 85 of the jig 84 is created, and further, a diameter of the pin gauge 86 is measured, and thereby a position of the center of the pin gauge 86 is measured. There is a case where displacement occurs in a position measurement result due to tolerance of the position of the pin gauge, and thus, the measurement result is different from a design position in many cases. Further, there is also a case where a measurement error occurs as a result of the measurement light LA not perpendicularly hitting the apex of the pin gauge 86. Here, the measurement result is assumed as (x1, y1, z1≈z0). In a case where the measurement result is different from the design position, thereafter, the jig 84 is used in recalibration indicated in FIG. 14 in the first and the second embodiments assuming that the center of the pin gauge 86 is located at (x1, y1, z0) of the measurement result in the workpiece coordinate system.

According to the third embodiment, before the recalibration method indicated in FIG. 14 is performed, the coordinate of the center of the pin gauge 86 has already been specified on the workpiece coordinate system, and thus, the pin gauge 86 can be positioned only by placing the jig 84 on the table 14 of the three-dimensional coordinate measurement apparatus 10. This can provide an effect that the pin gauge 83 can be easily positioned in addition to the effects in the above-described embodiments.

As described above, according to the first to the third embodiments, the emission direction of the measurement light LA emitted from the optical rotation probe 26 can be calibrated with high accuracy. It is therefore possible to reduce the measurement error of the optical rotation probe 26, which eventually makes it possible to reduce the measurement error of the three-dimensional coordinate measurement apparatus 10 equipped with the optical rotation probe 26. By this means, for example, it is possible to measure a shape with a great curvature of a local portion of the object to be measured with high accuracy.

While the examples of the presently disclosed subject matter have been described above, the presently disclosed subject matter is not limited to the above-described embodiments, and it goes without saying that various modifications are possible within a range not deviating from the spirit of the presently disclosed subject matter.

REFERENCE SIGNS LIST

10 . . . Three-dimensional coordinate measurement apparatus, 26 . . . Optical rotation probe, 28 . . . Wavelength swept light source, 36 . . . Photodetector, 40 . . . Fixed optical system, 42 . . . Rotating optical system, 44 . . . Optical fiber cable, 44a . . . Emission/incident end, 48 . . . Collimator lens, 50 . . . Hollow motor, 52 . . . Stator, 54 . . . Rotor, 54a . . . Hollow portion, 62 . . . Shaft, 62a . . . Longitudinal axis, 62b . . . Inner surface, 64 . . . Imaging lens, 66 . . . Right angle prism mirror, 70 . . . Controller, 72 . . . Control apparatus, 80 . . . Beam profiler, 81 . . . Ring gauge, 82 . . . Calibration sphere, 83, 86 . . . Pin gauge, 84 . . . Jig, and 85 . . . Block

What is claimed is:

1. A calibration method for an optical rotation probe capable of emitting measurement light in a direction perpendicular to a probe axis and capable of rotating an emission direction of the measurement light around the probe axis, the calibration method comprising:

a change step of changing the emission direction of the measurement light by a minute angle from a reference direction set in advance;

an acquisition step of acquiring a measurement value of a shape error for a reference object after the change step by emitting the measurement light from the optical rotation probe toward the reference object while rotating the emission direction of the measurement light around the probe axis and varying a relative position between the optical rotation probe and the reference object;

an obtaining step of using the measurement value to obtain a quadratic function in which the measurement value of the shape error is expressed as a polynomial including a square of the minute angle, an adjustment error calculation step of determining the minute angle when the measurement value has an extreme value in the quadratic function, and calculating the minute angle as an adjustment error of the emission direction of the measurement light with respect to the reference direction based on a theoretical value of the shape error for the reference object to be obtained in a case where the emission direction of the measurement light matches the reference direction and the measurement value of the shape error for the reference object obtained in the acquisition step; and a calibration step of calibrating the optical rotation probe based on the adjustment error.

2. The calibration method for the optical rotation probe according to claim 1, wherein each of the change step and the acquisition step is performed a plurality of times while altering the minute angle, and in the adjustment error calculation step, the adjustment error of the emission direction of the measurement light with respect to the reference direction is calculated based on the shape error for the reference object acquired for each of the minute angle.

3. The calibration method for the optical rotation probe according to claim 1, wherein, in the acquisition step, the relative position between the optical rotation probe and the reference object is varied such that a distance between the optical rotation probe and the reference object is constant.

4. The calibration method for the optical rotation probe according to claim 1, wherein, in the acquisition step, the relative position between the optical rotation probe and the reference object is varied such that a surface to be measured of the reference object is located in a range of a focal position of the measurement light±a focal depth.

5. The calibration method for the optical rotation probe according to claim 1, wherein the reference object is a pin gauge disposed in parallel to the probe axis.

6. The calibration method for the optical rotation probe according to claim 5, wherein, in the acquisition step, a radius error for the pin gauge is acquired as the shape error for the reference object.

* * * * *